(12) United States Patent
Mishra et al.

(10) Patent No.: US 10,198,264 B2
(45) Date of Patent: Feb. 5, 2019

(54) SORTING DATA AND MERGING SORTED DATA IN AN INSTRUCTION SET ARCHITECTURE

(71) Applicant: Intel Corporation, Santa Clara, CA (US)

(72) Inventors: Asit K. Mishra, Hillsboro, OR (US); Deborah T. Marr, Portland, OR (US); Jong Soo Park, Santa Clara, CA (US); Nadathur Rajagopalan Satish, Santa Clara, CA (US); Mikhail Smelyanskiy, San Francisco, CA (US); Michael Anderson, Santa Clara, CA (US); Mostofa Ali Patwary, Santa Clara, CA (US); Narayanan Sundaram, Santa Clara, CA (US); Sheng Li, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 14/969,864

(22) Filed: Dec. 15, 2015

(65) Prior Publication Data

US 2017/0168827 A1    Jun. 15, 2017

(51) Int. Cl.
*G06F 9/30* (2018.01)

(52) U.S. Cl.
CPC ...... *G06F 9/30192* (2013.01); *G06F 9/30021* (2013.01); *G06F 9/30029* (2013.01); *G06F 9/30032* (2013.01); *G06F 9/30036* (2013.01); *G06F 9/30145* (2013.01)

(58) Field of Classification Search
None
See application file for complete search history.

(56) References Cited

U.S. PATENT DOCUMENTS

| 8,108,411 | B2 | 1/2012 | Uppala et al. | |
|---|---|---|---|---|
| 2008/0104374 | A1* | 5/2008 | Mohamed | G06F 7/24 712/220 |
| 2009/0222644 | A1* | 9/2009 | Inoue | G06F 9/30021 712/22 |

(Continued)

FOREIGN PATENT DOCUMENTS

| EP | 0214313 | 3/1993 |
|---|---|---|
| WO | WO2010104664 | 9/2010 |

OTHER PUBLICATIONS

International Search Report and Written Opinion for PCT/US2016/061901 dated Feb. 15, 2017, 10 pages.

*Primary Examiner* — John M Lindlof
(74) *Attorney, Agent, or Firm* — Lowenstein Sandler LLP

(57) ABSTRACT

A processing device includes a sorting module, which adds to each of a plurality of elements a position value of a corresponding position in a register rest resulting in a plurality of transformed elements in corresponding positions. The plurality of elements include a plurality of bits. The sorting module compares each of the plurality of transformed elements to itself and to one another. The sorting module also assigns one of an enabled or disabled indicator to each of the plurality of the transformed elements based on the comparison. The sorting module further counts a number of the enabled indicators assigned to each of the plurality of the transformed elements to generate a sorted sequence of the plurality of elements.

25 Claims, 20 Drawing Sheets

(56) References Cited

U.S. PATENT DOCUMENTS

| | | | |
|---|---|---|---|
| 2010/0235163 A1* | 9/2010 | Hsu | G06F 17/2223 704/9 |
| 2013/0042092 A1 | 2/2013 | Inoue et al. | |
| 2013/0346425 A1 | 12/2013 | Bruestle | |

* cited by examiner

First set of sorted sequence: 1 4 7 8

Second set of sorted sequence: 3 7 10 15

| | Lower Half | | | | Upper Half | | | |
|---|---|---|---|---|---|---|---|---|
| Position Vector | 0 | 1 | 2 | 3 | 4 | 5 | 6 | 7 |
| First & Second Set of sorted sequences | 1 | 4 | 7 | 8 | 3 | 7 | 10 | 15 |
| Attach vector as payload | 1[0] | 4[1] | 7[2] | 8[3] | 3[4] | 7[5] | 10[6] | 15[7] |
| Result of merge sequence | 1[0] | 3[4] | 4[1] | 7[2] | 7[5] | 8[3] | 10[6] | 15[7] |
| Sorted Merged Sequence | 0 | 4 | 1 | 2 | 5 | 3 | 6 | 7 |

Fig. 6

SORTING DATA AND MERGING SORTED DATA IN AN INSTRUCTION SET ARCHITECTURE

TECHNICAL FIELD

Embodiments described herein generally relate to processing devices and, more specifically, relate to sorting data and merging sorted data in instruction set architecture for processing devices.

BACKGROUND

Sorting is an important kernel that is widely used by numerous computer applications. In databases, sorting helps to order data, create indices and perform binary searches. Sorting facilitates statistics-related applications including finding a closest pair, determining an element's uniqueness, finding a kth largest element and identifying outliers. Sorting is used in physical simulation, for example to find the convex hull to facilitate collision detection. Sorting is also used in big data applications, specifically graph analytics, where it is used to sort the key/value pairs that make up the output vector during vertex programming. Merge sort is very widely used implementation of sort. Key primitive within merge sort is merging two sorted sequences.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is an example of merging in an instruction set architecture execution environment according to an embodiment of the disclosure;

DETAILED DESCRIPTION

Figure 1:
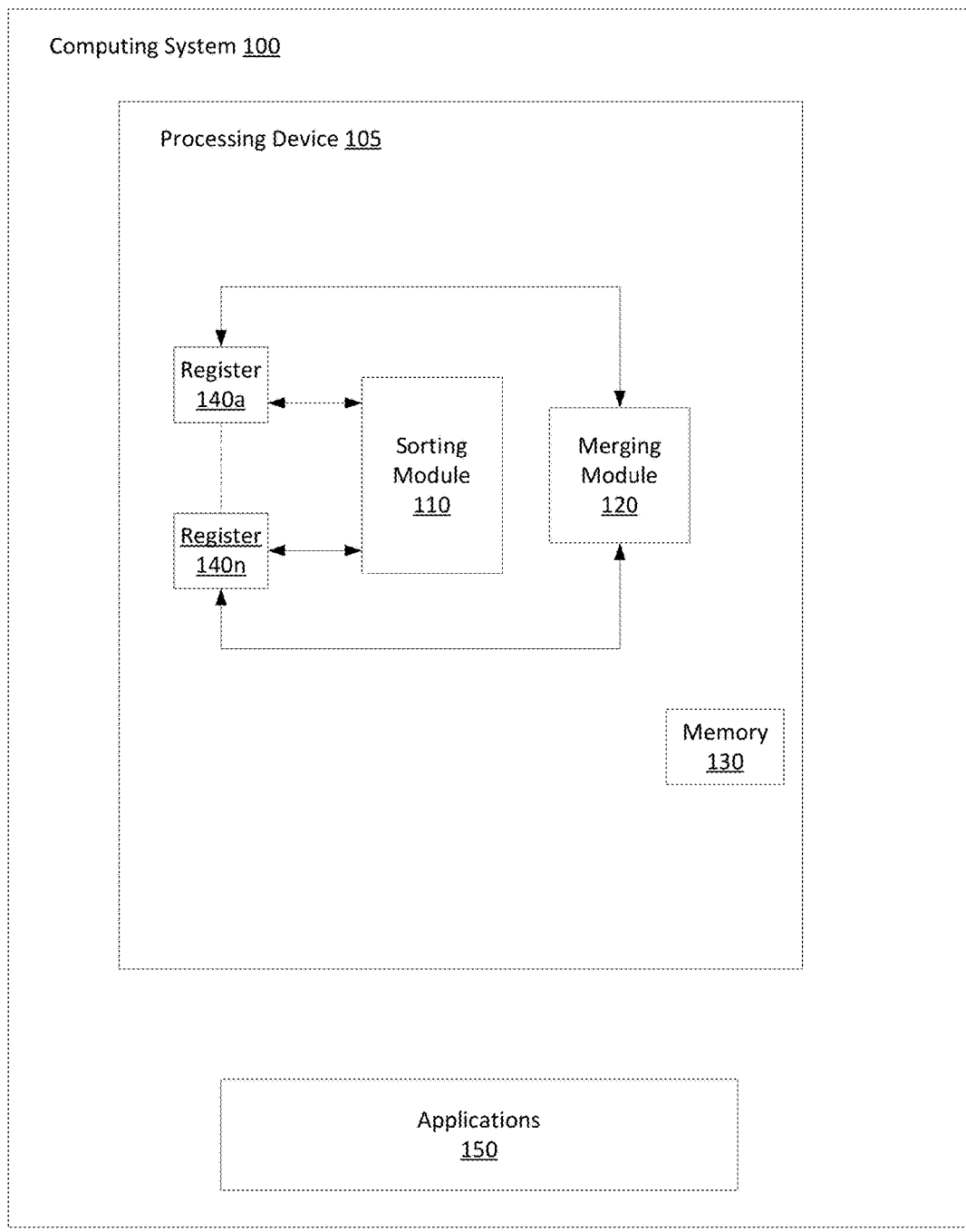
FIG. 1 is a block diagram of one embodiment of a computing system including a processing device that implements an instruction set architecture environment.

Disclosed herein are embodiments for providing an instruction set architecture environment for sorting data and merging the sorted data in a computing system.

Existing data sorting mechanisms are implemented in software in a computing system, which can sort data elements stored in a register in the computing system. Current data sorting mechanisms take many cycles or instructions to sort each data element. For example, it can take at least 15 cycles and 12 instructions to sort 1 data element. As a result, sorting the data in big data applications may consume a large number of instructions or cycles, which is time consuming.

Embodiments of the disclosure overcome the above problems by sorting data elements using hardware logic, such as cross bar logic, count logic, and permute logic. In one embodiment, cross bar logic left shifts n unsorted elements (in a register) by a specific number of bits when a value of an element among the n unsorted elements is same as the value of another element among the n sorted elements, adds a position value to each of the left shifted n elements to generate a transformed n elements, and compares each of the transformed n elements with other of the transformed n elements. In one embodiment, count logic generates a resulting sequence of n elements of relative order based on the comparison, and the permute logic permutes the resulting sequence of n elements and outputs the permuted sequence of n sorted elements to the register. In one embodiment, the cross bar logic takes 4 cycles, count logic takes 1 cycle, and permute logic takes 1 cycle. As a result, a total of 6 cycles may be used to sort 16 data elements. Accordingly, embodiments of the disclosure speed up the sorting of the data elements by at least 35 times than the existing data sorting mechanisms.

Existing sorted data merging mechanisms are implemented in software in a computing system, which can merge sorted data elements stored in a register in the computing system. Current data merging mechanisms merge each data element one at a time, which can take many cycles or instructions. For example, for 16 elements, merging of each data element can take about 15 cycles and 12 instructions per merge.

Embodiments of the disclosure overcome the above problems for merging sorted data elements by implementing hardware logic to perform the merge operations, such as divide logic, position payload logic, bitonic logic, sort payload logic, and permute logic. In one embodiment, divide logic divides two sets of sorted input sequences of n elements (in a register) into two halves: a lower half and an upper half. In one embodiment, position payload logic attaches a position identifier as a payload for each of the n elements, both in the upper half and the lower half. In one embodiment, bitonic logic merges each of the n elements in the upper half with each of the n elements in the lower half. The sort payload logic can then use the position of each of the merged sorted n elements to generate a sorted merged sequence of n elements. In one embodiment, permute logic permutes the resulting sorted merged sequence of n elements and outputs the permuted sorted merged sequence of n sorted elements to a register. For 16 elements, implementations of the disclosure may utilize 2 cycles or instructions to merge each data element at a time (i.e., by merging 8 elements per cycle) resulting in 8 times the speed of performance as compared to the existing sorted data merging mechanisms.

Alternatively, embodiments of the disclosure can overcome the above problems of merging sorted data elements by implementing other hardware logic, such as a identify logic, bitonic logic, mask logic, sort mask logic, and permute logic. In one embodiment, identify logic identifies a plurality of sets of the n elements from a first input sequence and a plurality of sets of the n elements from a second input sequence of the two sets of sorted input sequences of the n elements (in the register). Bitonic logic may first compare each of the of the identified elements in each of the plurality of sets from the first sequence with each of the identified elements in each of the plurality of sets from the second sequence. The bitonic logic additionally compares each of the identified elements in each of the plurality of sets from the second sequence with each of the identified elements in each of the plurality of sets from the first sequence. In one embodiment, mask logic selects the identified elements from each of the plurality of sets from the first sequence based on the first comparison and also selects the identified elements from each of the plurality of sets from the second sequence based on the second comparison. Mask logic can then merge the selected identified elements from each of the plurality of sets from the first sequence with the selected identified elements from each of the plurality of sets from the second sequence. In one embodiment, sort mask logic sorts the merged selected identified elements to generate a sorted merged sequence of n elements. In one embodiment, permute logic permutes the resulting sorted merged sequence of n elements and outputs the permuted sorted merged sequence of n sorted elements to the register.

Accordingly, embodiments of the disclosure improve processing speed related to merging data elements by merging multiple data elements at the same time, as opposed to previous solutions of merging one data element at a time. Further, embodiments of the disclosure merge multiple sorted input sequences to create a globally sorted output.

FIG. 1 is a block diagram of a computing system 100 that implements instruction set architecture (ISA) for processing devices. Some examples of computing system 100 may include, but are not limited to computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine.

Computing system 100 may include, for example, a processing device 105 to handle operations for computing system 100. The processing device 105 may comprise one or more processing devices (also known as processors) situated in separate components, or alternatively, one or more processing cores embodied in a single integrated circuit (IC) arranged, for example, in a System-on-a-Chip (SOC) configuration. In some embodiments, the processing device is a general purpose processing device. For example, the processing device 105 includes processing devices of the type commonly used as a central processing unit (CPU). In other embodiments, the processing device may be a special-purpose processing device. Examples of special purpose processors include, but are not limited to, co-processing devices, graphics processing devices, communications processing devices, network processing devices, cryptographic processing devices, embedded processing devices, digital signal processing devices (DSPs), etc. The processing device 105 can be connected to a socket. In some embodiments, if there are multiple processing devices, the processing device 105 can be connected to the same socket or different sockets.

The computing system 100 may include one or more various applications 150 executed by the processing device 105. Instructions to implement applications 150 (i.e. computer-executable program) may be executed in the processing device 105. The instructions may include, but are not limited to, add operations, shift operations, compare operation, count operation, convert operations, permute operations, and shuffle operations.

Although the processing device 105 and the application 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The processing device 105 may include modules such as a sorting module 110, a merging module 120, and one or more registers 140a-n. In one embodiment, a module is a hardware component such as hardware circuitry that performs certain operations. The module may be a self-contained component that interacts with other components in the processing device of the computer system.

Sorting module 110 can execute instructions corresponding to the application 150. Instructions may include program code to cause sorting module 110 to sort a sequence of n data elements (elements), each of which having a specific number of bits. Specifically, the instructions cause the sorting module 110 to perform activities such as, but not limited to, reading/retrieving a sequence of unsorted n elements in their corresponding positions in the registers 140a-n, left shifting the unsorted elements by log (n) bits, adding to each of the shifted unsorted n elements a value of the corresponding position resulting in transformed n elements, comparing each of the transformed n elements with other of the transformed n elements to generate a resulting sequence of n elements of relative order, and permuting the resulting sequence of n elements to output the permuted sequence of n sorted elements to the registers 140a-n. Information, including instructions, data, etc. (not shown) may be stored in a memory 130.

Merging module 120 can execute the instructions corresponding to the application 150. Instructions may include program code to cause merging module 120 to merge two sets of sorted sequences into a merged sequence and sort the merged sequence to generate a sorted merged sequence. Each of the two sets of sorted sequences include n elements, each of which having the specific number of bits.

In one embodiment, the instructions cause the merging module 120 to perform activities such as, but not limited to, reading/retrieving two sets of sorted sequences including sorted n elements in their corresponding positions in the registers 140a-n, dividing the two sets of sorted sequences of the n elements between two halves, a lower half and an upper half, attaching position as a payload for each of the n elements both in the upper half and the lower half, merging each of the n elements in the upper half with each of the n elements in the lower half, and using the position of each of the merged sorted n elements to generate a resulting sorted merged sequence of n elements, and permuting the resulting sorted merged sequence of n elements to output the permuted sorted merged sequence of n sorted elements to the registers 140a-n. Information, including instructions, data, etc. (not shown) may be stored in a memory 130.

In another embodiment, the instructions cause the merging module 120 to perform activities such as, but not limited to, reading/retrieving two sets of sorted sequences each of which includes n elements in their corresponding positions in the registers 140a-n, identifying a plurality of sets of the n elements from the first sequence and a plurality of sets of the n elements from the second sequence, comparing each of the of the identified elements in each of the plurality of sets from the first sequence with each of the identified elements in each of the plurality of sets from the second sequence, selecting the identified elements from each of the plurality of sets from the first sequence based on the comparison, comparing each of the identified elements in each of the plurality of sets from the second sequence with each of the identified elements in each of the plurality of sets from the first sequence, selecting the identified elements from each of the plurality of sets from the second sequence based on the comparison, merging the selected identified elements from each of the plurality of sets from the first sequence with the selected identified elements from each of the plurality of sets from the second sequence, sorting the merged selected identified elements to generate a resulting sorted merged sequence of n elements, and permuting the resulting sorted merged sequence of n elements to output the permuted sorted merged sequence of n sorted elements to the registers 140a-n. Information, including instructions, data, etc. (not shown) may be stored in a memory 130.

The memory 130 may include random access memory (RAM), non-volatile memory, or read-only memory (ROM) in a fixed or removable format. RAM may include memory to hold information during the operation of computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. In one embodiment, the memory 130 is protected such that the memory 130 is accessible and/or modifiable by the sorting module 110 and by the merging module 120.

Registers 140a-n can include registers and/or storage used during execution of instructions by the sorting module 110 while the computing system 100 is in a sorting state to be able to read the unsorted elements in the data. In one embodiment, the register is a single instruction multiple data (SIMD) register. In one embodiment, the registers 140a-n are vector data registers. Registers 140a-n can include, but are not limited to, registers for temporary values, a stack pointer, a pointer to data elements, temporary storage for instructions to execute in the computing system 100, etc. In one embodiment, registers 140a-n can be protected to be solely accessible and/or modifiable by the sorting module 110 and the merging module 120. The registers 140a-n may be readable to software executing outside of the sorting module 110 and the merging module 120.

Figure 2:
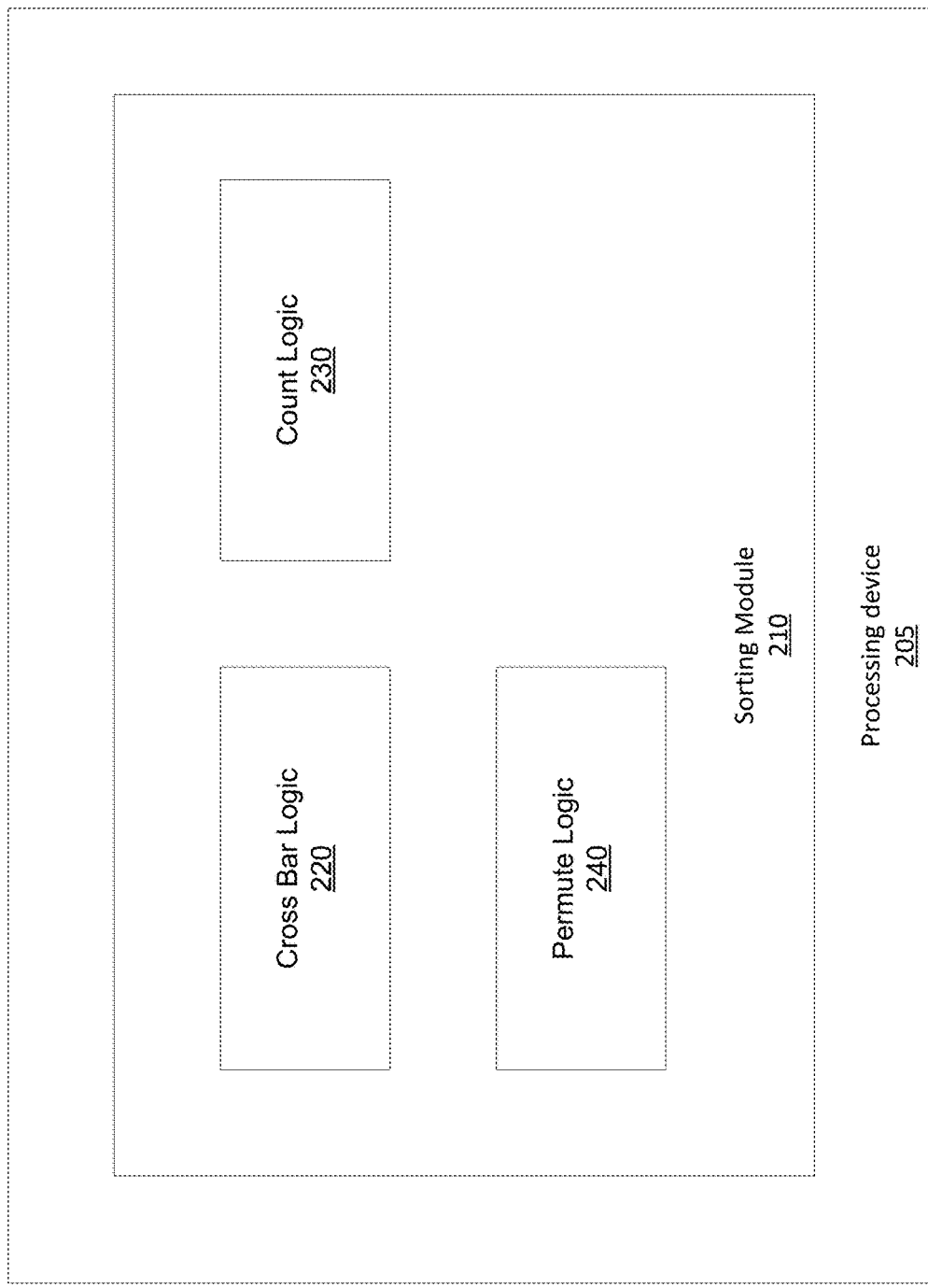
FIG. 2 is a block diagram illustrating a sorting module to implement an instruction set architecture execution environment according to an embodiment of the disclosure.

FIG. 2 illustrates a processing device 205 including a sorting module 210 to implement an instruction set architecture environment, in accordance with one embodiment of the present disclosure. In one embodiment, the processing device 205 is same as the processing device 105 described above with respect to FIG. 1. In one embodiment, the sorting module 210 is the same as sorting module 110 described above with respect to FIG. 1. The sorting module 210 may include logics such as cross bar logic 220, count logic 230, and permute logic 240. In one embodiment, a logic is a hardware component such as a hardware circuitry that performs certain operations. The logic may be a self-contained component that interacts with other components in the processing device of the computer system.

More or less components may be included in the sorting module 210 without loss of generality.

In one embodiment, the sorting module 210 receives an input of a sequence of unsorted n data elements (elements) from a register, such as register 140a-n described with respect to FIG. 1. In one embodiment, the data element is a unit of data defined for processing. A data element may be defined by size and type. In one embodiment, the registers 140a-n are source registers. Each of the n elements includes a specific number of bits. In one embodiment, each of the registers 140a-n is a 512-bit register including 16 elements of 32 bits each. In one embodiment, each of the registers 140a-n is a 512-bit register including 8 elements of 64 bits each. The cross bar logic 220 places the unsorted n elements in a cross bar in their corresponding positions to aid in sorting the elements. In one embodiment, cross bar logic 220 is a cross bar switch that includes a collection of switches arranged in a matrix configuration.

Figure 3:
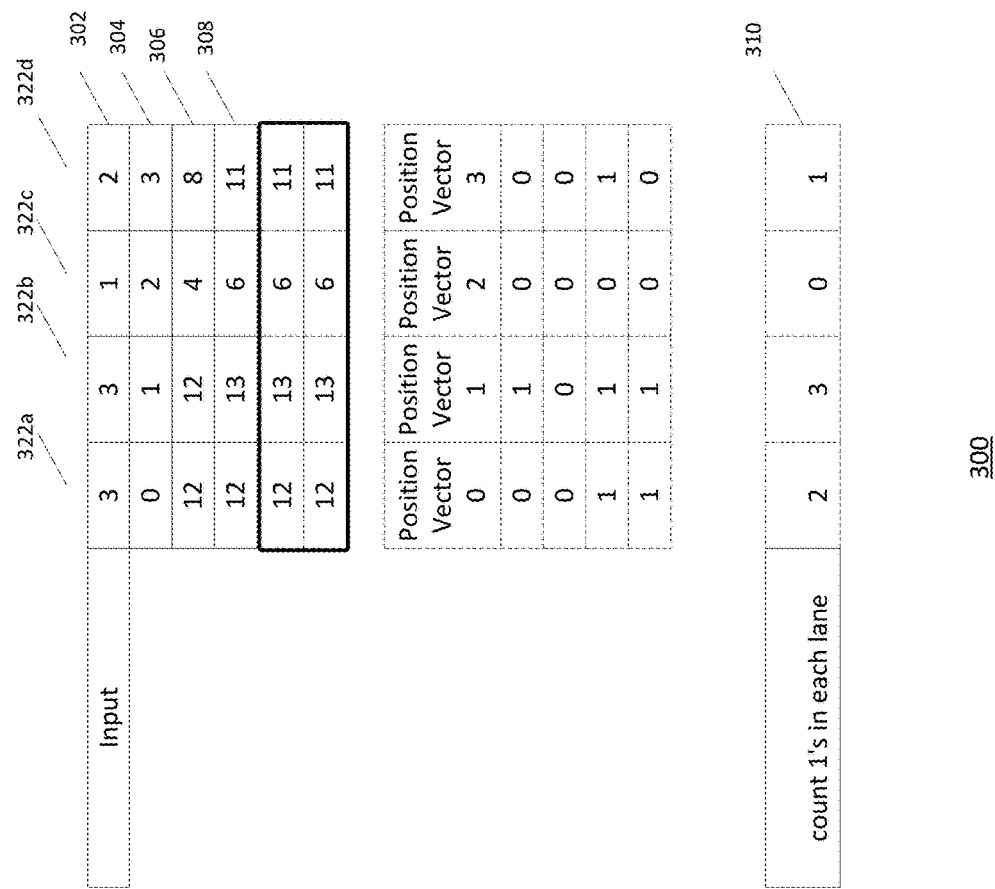
FIG. 3 is an example of sorting in an instruction set architecture execution environment according to an embodiment of the disclosure.

As an example, the n unsorted elements are 4 elements of decimal numbers consisting of 3 3 1 2, each of which include 32 bits in a 128 bit register FIG. 3 is a block diagram 300 depicting a conceptual sorting of an input sequence by a 4×4 cross bar according to an example embodiment. As shown in FIG. 3, the decimal numbers 3 3 1 2 are the input placed in a first row 302 in separate columns 322a, 322b, 322c and 322d. The second row 304 displays the position vector values 0 1 2 3 in separate columns. Accordingly, the position vector values for the numbers 3 3 1 2 are 0 1 2 3, respectively. The binary value of 3 is 0011, the binary value of 1 is 0001 and the binary value of 2 is 0010.

In one embodiment, the cross bar logic 220 left shifts each of the unsorted n elements by log (n) bits when a value of at least one element among the n unsorted elements is same as the value of another element among the n unsorted elements. In one embodiment, the log (n) bits are half the number of bits in the n. In one embodiment, the left shifting is performed to handle repetition in values of the inputted unsorted n elements. In other embodiments, if there are no repetition in these values of the inputted unsorted n elements, and the hardware circuitry is aware of no repetition in these values, then left shifting is not performed. In one embodiment, the hardware circuitry is aware of no repetition in the input values of these unsorted n elements from a programmer or a user of the hardware circuitry.

Returning back to the example in FIG. 3, each of these 4 unsorted elements is left shifted by 2 bits. The left shift of the binary value 0011 results in 1100, which translates to a decimal value of 12. The left shift of the binary value 0001 results in 0100, which translates to a decimal value of 4. The left shift of the binary value 0010 results in 1000, which translates into a decimal value of 8. As a result, the left shifted values of the decimal numbers 3 3 1 2 are 12 12 4 8, respectively. Each of the 12 12 4 8 are inserted in a third row 306 in their separate columns corresponding to their unsorted numbers 3 3 1 2. In one embodiment, the cross bar logic 220 adds to each of the left shifted unsorted n elements a positon vector value of the corresponding position of each of the unsorted n elements. In one embodiment, the result of the addition outputs transformed n elements that maintain a relative ordering of the input sequence of unsorted n elements without any replicated values. Returning back to the example in FIG. 3, position vector values 0 1 2 3 are added to each of the corresponding left shifted values 12 12 4 8, resulting in decimal values 12 13 6 11, respectively in the fourth row 308.

In one embodiment, the cross bar logic 220 compares each of the transformed n elements with itself and other of the transformed n elements. In one embodiment, the cross bar logic 220 assigns one of an enabled or disabled indicator when comparing each of the transformed n elements with itself and other of the transformed n elements. In one embodiment, the enabled indicator includes a value of 1 and the disabled indicator includes a value of 0. In one embodiment, the cross bar logic 220 places this assigned value of 1 or 0 for each of the transformed n elements in their corresponding positions. In one embodiment, the unsorted n elements are to be sorted in ascending order. According, the cross bar logic 220 performs a greater-than operation when comparing each of the transformed n elements. In one embodiment, the cross bar logic 220 assigns a value of 1 when each of the transformed n elements is greater than other of the transformed n elements and assigns a value of 0 when each of the transformed n elements is not greater than itself and other of the transformed n elements. In one embodiment, the unsorted n elements are to be sorted in descending order. Accordingly, the cross bar logic 220 performs a less-than operation when comparing each of the transformed n elements. In one embodiment, the cross bar logic 220 assigns a value of 1 when each of the transformed n elements is less than other of the transformed n elements and assigns a value of 0 when each of the transformed n elements is less than itself and other of the transformed n elements.

Returning back to the example in FIG. 3, each of the resulting values 12 13 6 and 11 are compared to themselves and the other resulting values. In this example, the comparing operation is a greater-than operation. For example, 12 is compared to itself, 13, 6, and 11 to determine whether 12 is greater than each of 12, 13, 6, and 11. Because 12 is not greater than 12, the value assigned is 0; because 12 is not greater than 13, the value assigned is 0; because 12 is greater than 6, the value assigned is 1; and because 12 is greater than 11, the value assigned is 1. Accordingly, the values in the column 322a with the positon vector value of 0 is 0 0 11. Similar comparing using the greater-than operation is performed for the values 12, 6, and 11, which results in the values in the column 322b with the position vector value of 1 being 1 0 1 1, the values in the column 322c with the position vector value of 2 being 0 0 0 0, and the values in the column 322d with the position vector 3 being 0 0 1 0.

In one embodiment, the count logic 230 counts the total number of is assigned to each of the transformed n elements in their corresponding positions in order to generate a sorted n elements of relative order. Returning back to the example in FIG. 3, the total number of is assigned to each of the resulting values 12 13 6 and 11 in their corresponding position vector values of 0 1 2 and 3 are 2 3 0 and 1, respectively as reflected in the last column 310. Accordingly, the 2 3 0 and 1 are the relative order of the unsorted input numbers of 3 3 1 2, respectively. In one embodiment, the permute logic 240 permutes (or shuffles) the sorted n elements of relative order and outputs the permuted sorted n elements to one of the registers 140a-n. In one embodiment, one of the registers 140a-n is the destination register. In one embodiment, the destination register is same as the source register. In one embodiment, the destination register is different from the source register. In one embodiment, the permute logic 240 assigns a position for each of the sorted n elements in the destination register, which corresponds to the position for each of the unsorted n elements in the source register and pushes the sorted n elements to their corresponding positions in the destination register.

Although FIG. 3 illustrates 4×4 cross bar as one example of n×n depicting a conceptual sorting of an input sequence, another example is 16×16 cross bar with 16 position vector values and 16 unsorted elements of decimal numbers each of which includes 32 bits in a 512 bit register producing 16 sorted elements of 256 bits of relative order.

Figure 4:
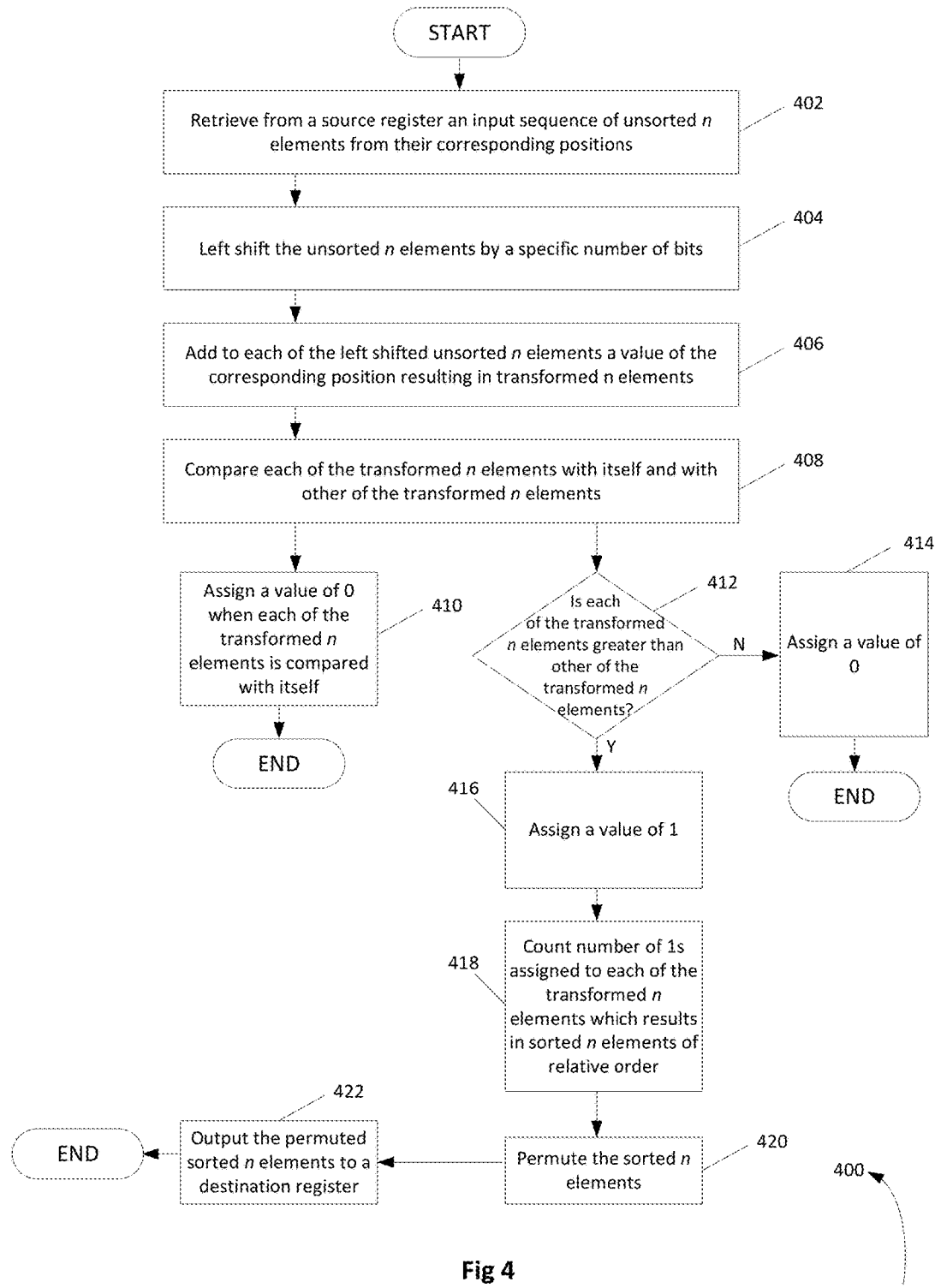
FIG. 4 is a flow diagram illustrating a method for sorting in an instruction set architecture execution environment according to an embodiment of the disclosure.

FIG. 4 is a flow diagram of a method 400 for sorting data in ascending order in an instruction set architecture environment of a processing device according to an embodiment of the disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by sorting module 110 and 210 described above with respect to FIGS. 1 and 2.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

At block 402, processing logic retrieves from a source register an input sequence of unsorted n data elements (elements) from their corresponding positions. At block 404, left shift the unsorted n elements by a specific number of bits. At block 406, each of the left shifted unsorted n elements is added with a value of the corresponding position resulting in transformed n elements. In one embodiment, the transformed n elements maintain the relative order of the input sequence of the unsorted n elements. In one embodiment, the transformed n elements eliminate any replicated values in the unsorted n elements. At block 408, compare each of the transformed n elements with itself and with other of the transformed n elements to generate a resulting sequence of n elements of relative order. At block 410, a value of 0 is assigned when each of the transformed n elements compared to itself as the transformed n elements is not greater than itself. At block 412, it is determined whether each of the transformed n elements is greater than other of the transformed n elements.

Subsequently, at block 414, a value of 0 is assigned when it is determined at block 412 that each of the transformed n elements is not greater than other of the transformed n elements. At block 416, a value of 1 is assigned when it is determined at block 412 that each of the transformed n elements is greater than other of the transformed n elements. At block 418, total number of is assigned to each of the transformed n elements is counted, which results in sorted n elements of relative order. At block 420, the sorted n elements are permuted. In one embodiment, the permute includes assigning a position for each of the sorted n elements in the destination register, which corresponds to the position for each of the unsorted n elements in the source register At block 422 the permuted sorted n elements are outputted to the destination register. In one embodiment, the destination register is same as the source register. In one embodiment, the destination register is different from the source register. In one embodiment, to sort in descending order, a less than operation is performed at block 412 such that at block 412 it would be determined whether each of the transformed n elements is less than other of the transformed n elements.

Figure 5:
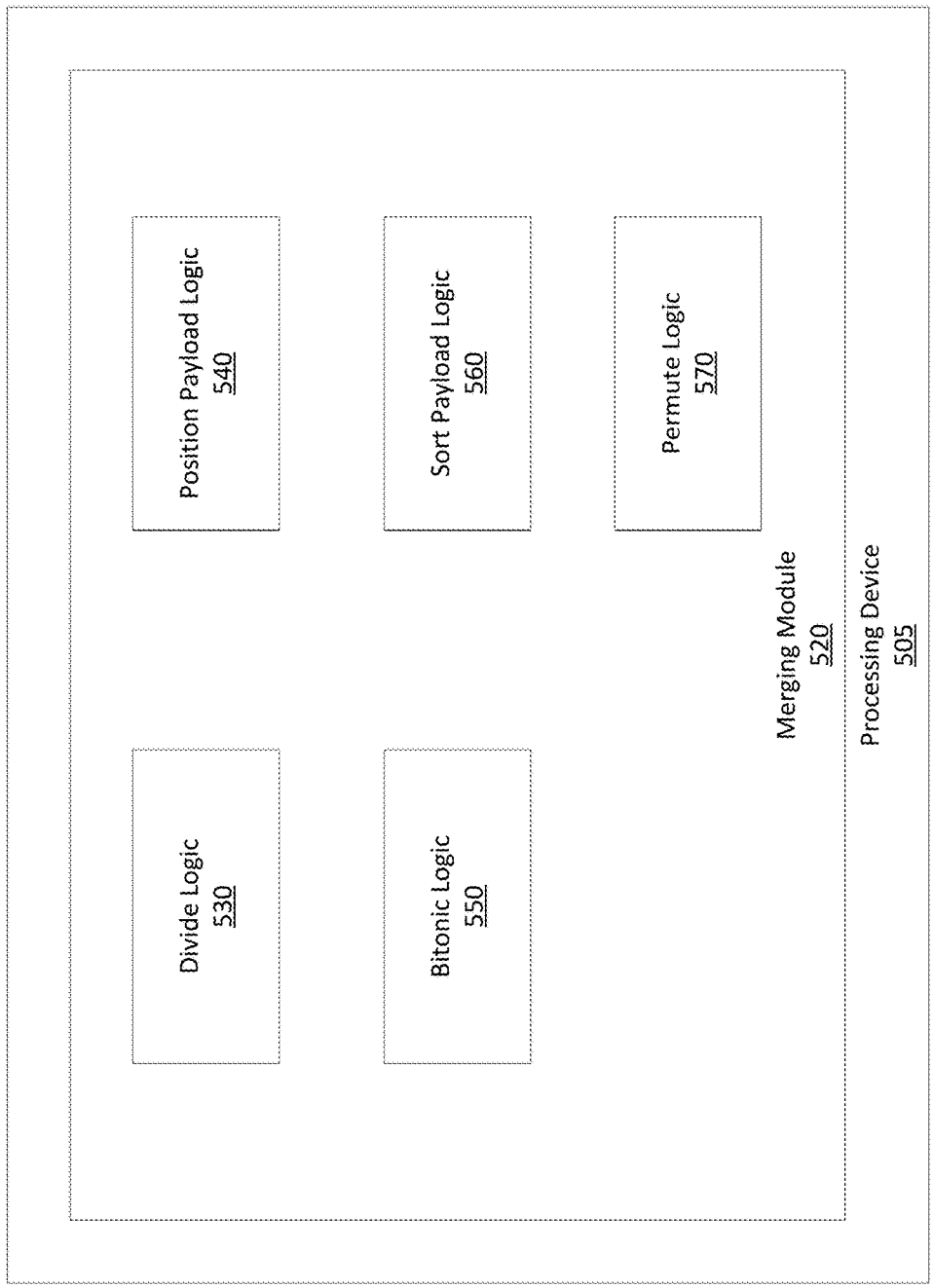
FIG. 5 is a block diagram illustrating merging module to implement an instruction set architecture execution environment according to an embodiment of the disclosure.

FIG. 5 is a block diagram illustrating a processing device 505 including a merging module 520 to implement an instruction set architecture environment, in accordance with one embodiment of the present disclosure. In one embodiment, the processing device 505 is same as the processing device 105 described above with respect to FIG. 1. In one embodiment, the merging module 520 is the same as merging module 120 described above with respect to FIG. 1. The merging module 520 may include logics such as a divide logic 530, a position payload logic 540, a bitonic logic 550, a sort payload logic 560 and a permute logic 570. In one embodiment, a logic is a hardware component such as a hardware circuitry that performs certain operations. The logic may be a self-contained component that interacts with other components in the processing device of the computer system. More or less components may be included in the merging module 520 without loss of generality.

In one embodiment, the merging module 520 receives an input of two sets of sorted sequences of n elements from at least one register such as registers 140*a-n* described with respect to FIG. 1. In one embodiment, the one of the registers 140*a-n* is a source register. Each of the n elements includes a specific number of bits. In one embodiment, one of the registers 140*a-n* is a 512 bit register including 16 elements of 32 bits each. In one embodiment, one of the registers 140*a-n* is a 512 bit register including 8 elements of 64 bits each. In one embodiment, one of the registers 140*a-n* is a 128 bit register including 4 elements of 32 bits each. In one embodiment, the divide logic 530 divides the two sets of input sorted sequences of the n elements between two halves, a first half and a second half such that one set of the input sorted sequence of the n elements is in the first half and other set of the input sorted sequence of the n elements is in the second half. Each of the n elements in the first half and the second half include their corresponding positions to aid in merging the elements.

As an example, the two sets of n elements include 4 elements, where each element is a decimal number. In the example, the decimal numbers may be 1 4 7 8 and 3 7 10 15, each of these numbers are 32 bits. FIG. 6 is a block diagram 600 depicting a conceptual illustration of an exemplary merging operation using merging module 520. As shown in FIG. 6, the example sets of sorted sequences of 4 elements are divided into the first half (e.g. lower half) 610 and the second half 612 (e.g. upper half), respectively, of a table 602. The decimal numbers 1 4 7 8 of the first set of the sorted sequence of the two sets is placed in the lower half 610 in the first four columns of the second row 620*b* of the table 602, and the second set of the sorted sequence of the two sets, 3 7 10 15, is placed in the upper half 612 in the last four columns in the second row of the table 602. The first row 620*a* displays the position vector values 0 through 7 in separate columns. Accordingly, the position vector values for the numbers of the lower half set 1 4 7 8 are 0 1 2 3, respectively and the position vector values for the numbers of the upper half set 3 7 10 15 are 4 5 6 7, respectively.

In one embodiment, the position payload logic 540 attaches the corresponding positions to each of the n elements in the lower half 610 and the upper half 612. Returning back to the example in FIG. 6, the corresponding position vector values 0 1 2 3 are attached to the decimal numbers 1 4 7 8 in the lower half 610 and the corresponding position vector values 4 5 6 7 are attached to the decimal numbers 3 7 10 15 in the upper half 612 as illustrated in brackets in the third row. As such, the lower half 610 of the third row 620*c* includes 1 [pos 0], 4 [pos 1], 7 [pos 2], 8 [pos 3] and the upper half 612 of the third row 620*c* includes 3 [pos 4], 7 [pos 5], 10 [pos 6] and 15 [pos 7]. In one embodiment, the bitonic logic 550 merges each of the n elements in the lower half 610 with each of the n elements in the upper half resulting in a merged sequence of n elements and attaches the corresponding positions to each of the merged n elements in the lower half 610 and the upper half 612, as shown in the fourth row 620*d* of the table 602.

In one embodiment, the merging includes comparing a value of each of the n elements in the lower half with each of the n elements in the upper half and comparing a value of each of the n elements in the upper half with each of the n elements in the lower half. As discussed above, the value of each of the n elements in the lower half come from one set of the two sets of sorted input sequence and the value of each of the n elements in the upper half come from another set of the two sets of sorted input sequence. (i.e. one is merging two sorted input to create a globally sorted output). When using bitonic merging process, the number of comparisons is $n*\log_2 n$.

These comparisons then result in a sorted sequence of 2n elements, which includes n elements in a row beginning with the element with the lowest value in the lower half and ending with the element with the highest value in the upper half. In one embodiment, the number of comparisons are square of the value of n (e.g., when n=8, the number of comparisons is 64; when n=16, the number of comparisons is 256).

In one embodiment, the merging includes comparing the values of the input n elements, of which the first half of the input elements (n/2 elements) come from one sorted input sequence and the remaining half of the input elements (n/2 elements) come from another sorted input sequence (i.e. one is merging two sorted input to create a globally sorted output). In the example referred to in FIG. 6, the first half may be lower half and the second half may be upper half or vice versa. When using bitonic merging process, the number of comparisons is $n*\log_2 n$.

Returning back to the example in FIG. 6, each of the decimal numbers 1 4 7 8 in lower half merge with each of the decimal numbers in the upper half 3 7 10 and 15 resulting in merged sequence of 8 elements. This merged sequence of 8 elements include 1 3 4 7 in the lower half and 7 8 10 15 in the upper half with their attached corresponding position vector values in the brackets such that the resulting merged sequence in the third row 620c includes 1 [pos 0], 3 [pos 4], 4 [pos 1], 7[ pos 2] in the lower half and 7 [pos 5], 8 [pos 3], 10 [pos 6], 15[ pos 7] in the upper half.

In one embodiment, the sort payload logic 560 retrieves the corresponding positions of each of the merged n elements in the lower half and the upper half as the resulting sorted merged sequence consisting of n elements. Referring to the example in FIG. 6, each of the corresponding position vector values 0 4 1 2 in the lower half from the third row 620c of the table 602 are retrieved and placed in the lower half of a fourth row and each of the corresponding position vector values 5 3 6 7 in the upper half from the third row are retrieved and placed in the upper half of the fourth row 620d. Accordingly, the resulting sorted merged sequence is (of position vector values) is 0 4 1 2 5 3 6 7 as shown in the fifth row 620e.

In one embodiment, the permute logic 570 permutes (or shuffles) the sorted merged sequence of n elements and outputs the permuted sorted merged n elements to one of the registers 140a-n. In one embodiment, one of the registers 140a-n is the destination register. In one embodiment, the destination register is same as the source register. In one embodiment, the destination register is different from the source register. In one embodiment, the permute logic 570 assigns a position for each of the sorted merged n elements in the destination register, which corresponds to the position for each of the sorted n elements in the source register, and pushes the sorted merged n elements to their corresponding positions in the destination register.

Figure 7:
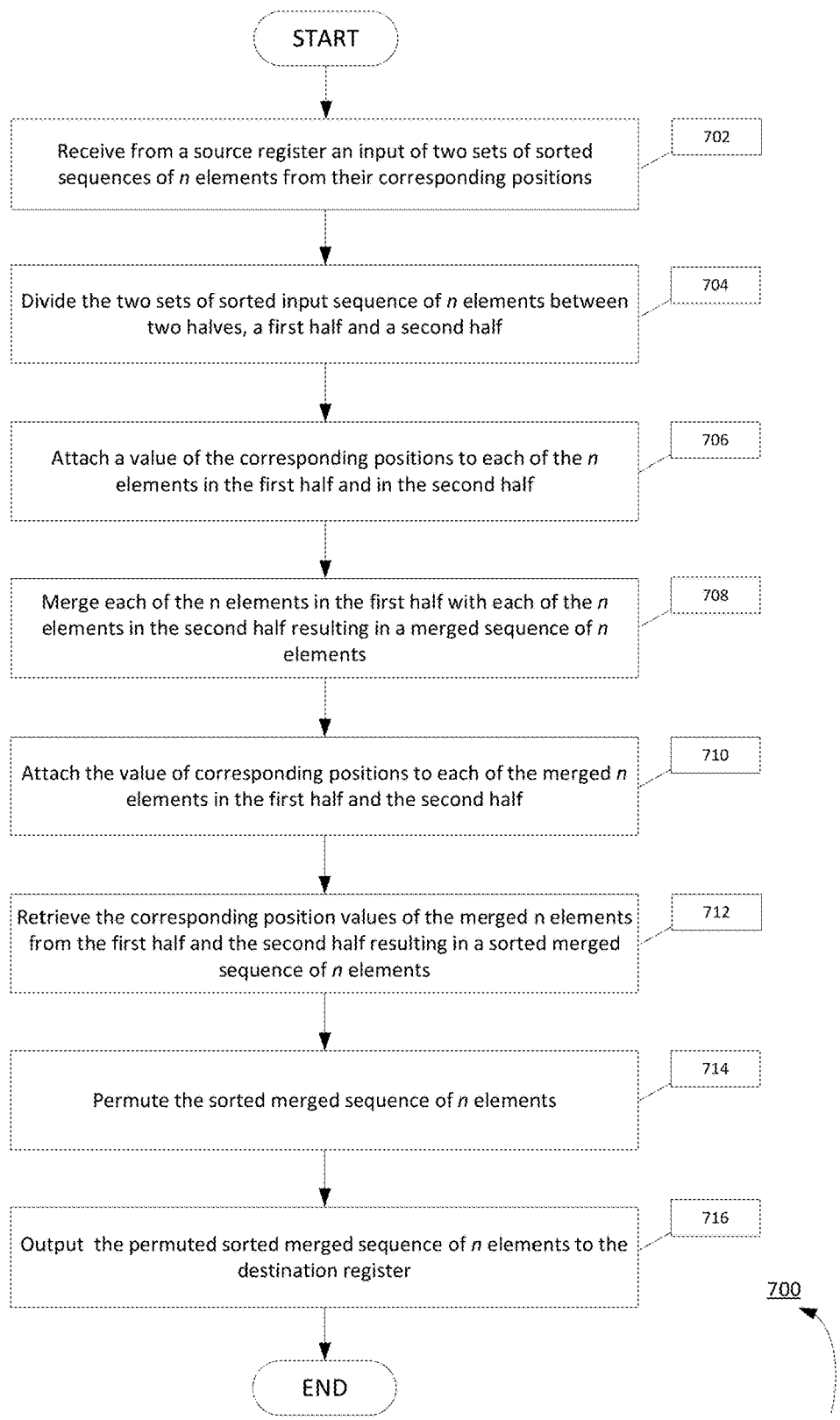
FIG. 7 is a flow diagram illustrating a method for merging in an instruction set architecture execution environment according to an embodiment of the disclosure.

FIG. 7 is a flow diagram of a method 700 for merging two sets of sorted sequences and sorting the merged sequence in an instruction set architecture environment of a processing device according to an embodiment of the disclosure. Method 700 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 700 may be performed, in part, by merging module 120 and 520 described above with respect to FIGS. 1 and 5.

For simplicity of explanation, the method 700 is depicted and described as a series of acts. However, acts in accordance with this disclosure can occur in various orders and/or concurrently and with other acts not presented and described herein. Furthermore, not all illustrated acts may be performed to implement the method 700 in accordance with the disclosed subject matter. In addition, those skilled in the art will understand and appreciate that the method 700 could alternatively be represented as a series of interrelated states via a state diagram or events.

At block 702, processing logic retrieves from a source register an input of two sets of sorted sequence of n data elements (elements) from their corresponding positions. At block 704, the two sets of sorted input sequences of n elements are divided between two halves, a first half and a second half with each of the n elements having their corresponding positions. At block 706, a value of the corresponding positions is attached to each of the n elements in the first half and in the second half. At block 708, each of the n elements in the first half are merged with each of the n elements in the second half resulting in a merged sequence of n elements. Accordingly, two sorted input sequences are merged to create a globally sorted output. At block 710, the value of the corresponding positions is attached to each of the merged n elements in the first half and in the second half.

Subsequently, at block 712, each of the corresponding positions values of the merged n elements are retrieved from the first half and the second half resulting in a sorted merged sequence of n elements. At block 714, the sorted merged sequence of n elements are permuted. In one embodiment, the permute operation includes assigning a position for each of the sorted merged n elements in the destination register, which corresponds to the position for each of the sorted n elements in the source register. At block 716, the permuted sorted merged sequence of n elements are outputted to the destination register. In one embodiment, the destination register is same as the source register. In one embodiment, the destination register is different from the source register.

Figure 8:
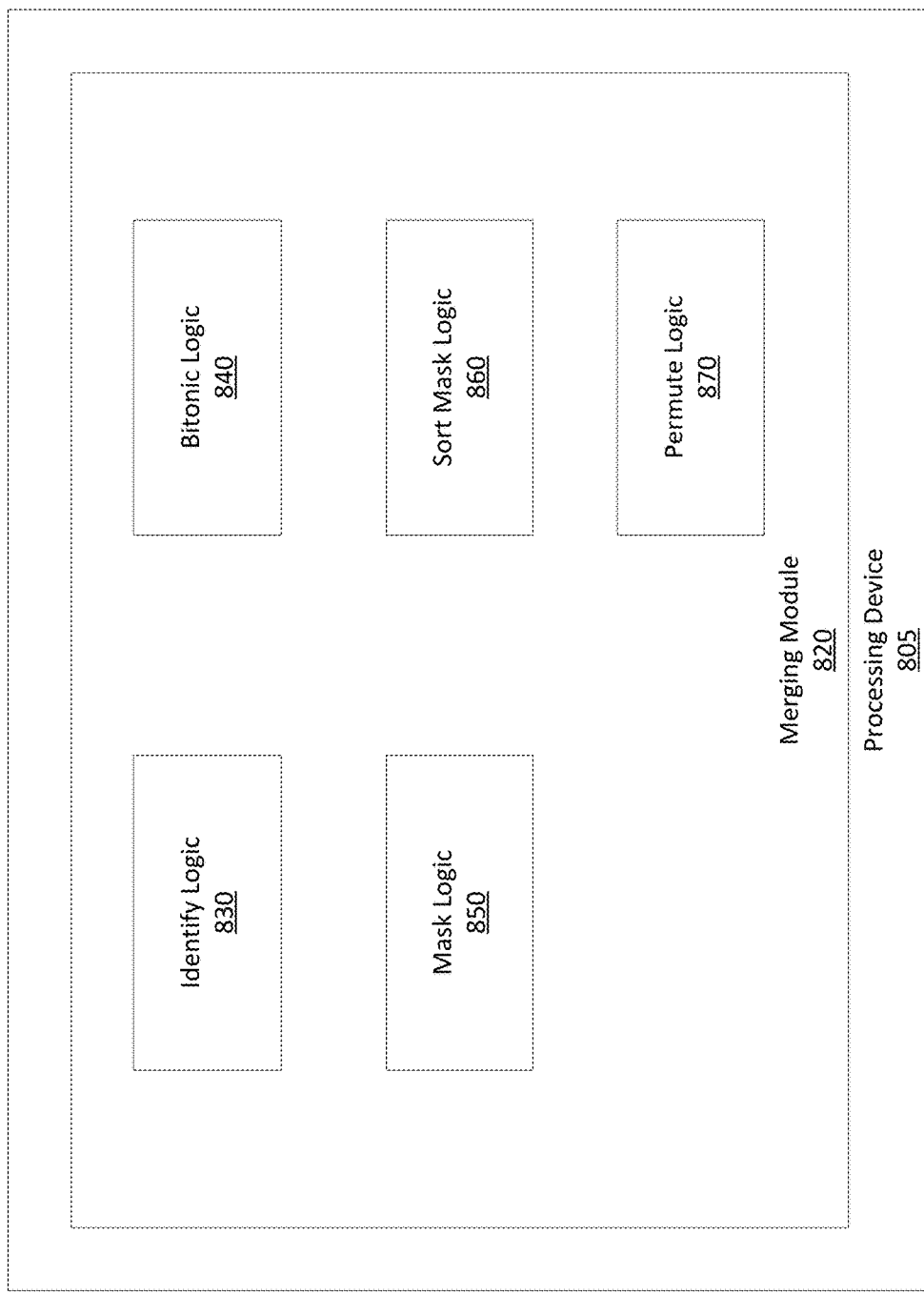
FIG. 8 is a block diagram illustrating merging module to implement an instruction set architecture execution environment according to an embodiment of the disclosure.

FIG. 8 is a block diagram illustrating a processing device 805 including a merging module 820 to implement an instruction set architecture environment, in accordance with one embodiment of the present disclosure. In one embodiment, the processing device 805 is same as the processing device 105 described above with respect to FIG. 1. In one embodiment, the merging module 820 is the same as merging module 120 described above with respect to FIG. 1. The merging module 820 may include logics such as a identify logic 830, a bitonic logic 840, a mask logic 850, a sort mask logic 860 and a permute logic 870. In one embodiment, a logic is a hardware component such as a hardware circuitry that performs certain operations. The logic may be a self-contained component that interacts with other components in the processing device of the computer system. More or less components may be included in the merging module 820 without loss of generality.

In one embodiment, the merging module 820 receives an input of two sets of sorted sequences of n elements from at least one of the register such as registers 140a-n described with respect to FIG. 1. In one embodiment, one of the registers 140a-n is a source register. Each of the n elements includes a specific number of bits. In one embodiment, one of the registers 140a-n is a 512 bit register including 16 elements of 32 bits each. In one embodiment, one of the registers 140a-n is a 512 bits register including 8 elements of 64 bit each. In one embodiment, the identify logic 830 identifies a first set of the n elements from the first sorted sequence and a second set of the n elements from the second sorted sequence.

Figure 9:
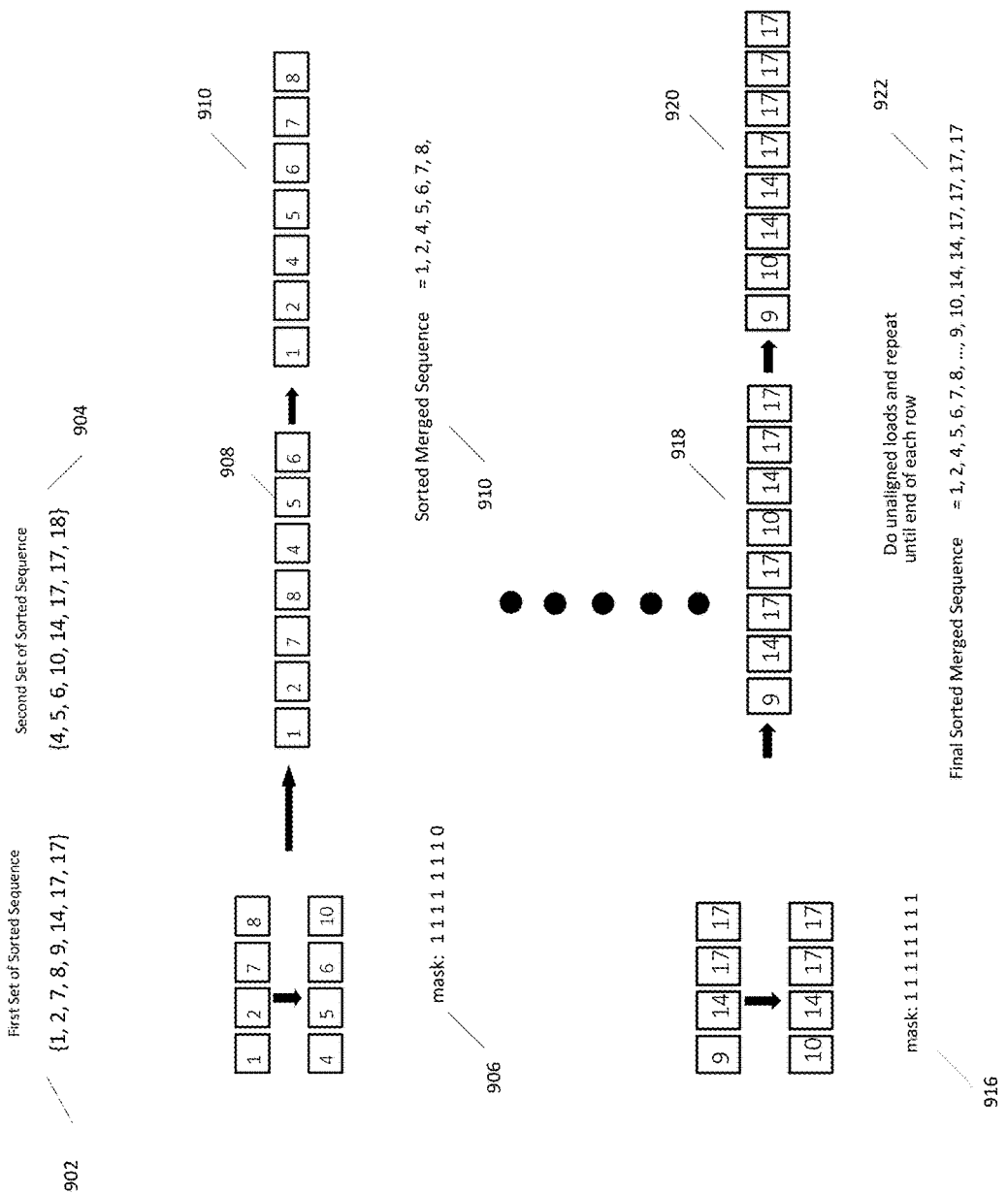
FIG. 9 is an example of merging in an instruction set architecture execution environment according to an embodiment of the disclosure.

FIG. 9 is a block diagram 900 depicting a conceptual illustration of a merge operation according to embodiments of the disclosure. The example depicted in FIG. 9 includes a first sorted input sequence of n elements, where the first sorted sequence includes 8 elements of decimal numbers consisting of 1 2 7 8 9 14 17 17 each of these numbers include 32 bits. In addition, a second sorted input sequence of the n elements is shown, where the second sorted sequence includes 8 elements of decimal numbers consisting of 4 5 6 10 14 17 17 18, each of these numbers also include 32 bits. In one embodiment, the identify logic 830 identifies a first set of the n elements from the first sorted sequence and a first set of the n elements from the sorted second sequence. Returning back to example in FIG. 9, the first set from the first sequence 902 includes the first four elements 1 2 7 8 and the first set from the second sequence 904 includes first four elements 4 5 6 10.

In one embodiment, the bitonic logic 840 merges the identified first set of elements from the first sorted sequence and the first set of elements from the second sorted sequence. The bitonic logic 840 may compare each element in the identified first set of the first sorted sequence with each element in the identified first set of second sorted sequence and assigns a value based on the comparison. Similarly, the bitonic logic 840 may compare each element in the first set of the second sorted sequence with each element in the first set of the first sorted sequence and assigns a value based on the comparison.

In one embodiment, the n elements are to be sorted in descending order. Accordingly, the bitonic logic 840 performs a less-than operation when comparing each of the identified set of the n elements in the first sequence with the second sequence and vice versa. In one embodiment, the bitonic logic 840 assigns a value of 1 when each one of the identified set of n elements in the first sequence is less than or equal to at least one other of the identified set of n elements in the second sequence and vice versa. In one embodiment, the bitonic logic 840 assigns a value of 0 when each one of the identified set of n elements in the first sequence is not less than at least one other of the identified set of n elements in the second sequence and vice versa.

In another embodiment, the n elements are to be sorted in ascending order. According, the bitonic logic 840 performs a greater than operation when comparing each of the identified set of the n elements in the first sequence with the second sequence and vice versa. In one embodiment, the bitonic logic 840 assigns a value of 1 when each of the identified set of n elements in the first sequence is greater than or equal to at least one other of the identified set of n elements in the second sequence and vice versa. In one embodiment, the bitonic logic 840 assigns a value of 0 when each of the identified set of n elements in the first sequence is not greater than at least other of the identified set of n elements in the second sequence and vice versa.

Returning back to example in FIG. 9, each of the elements 1 2 7 8 in the first sequence 902 is compared with each of the elements 4 5 6 10 in the second sequence 904. In this example, the comparing is a less-than operation such that the decimal value 1 in the first sequence is compared to the other decimal values to determine whether it is less than or equal to those values (e.g., at least one of the 4 5 6 10 in the second sequence), similarly 2 in the first sequence is compared to determine whether it is less than or equal to at least one of 4 5 6 10 in the second sequence, and so on. Accordingly, mask value 906 of 1 1 1 1 is assigned for all the elements 1 2 7 8 for the first sequence. Furthermore, each of the elements 4 5 6 10 in the second sequence is compared with each of the elements 1 2 7 8 in the first sequence. Accordingly, the mask value 906 of 1 1 1 0 is assigned for all the elements 4 5 6 10 for the second sequence.

In one embodiment, the mask logic 850 selects those elements in the first set of the first sequence assigned with the value of 1 and selects those elements in the first set of the second sequence assigned with the value of 1. These selected elements are joined together by mask logic 850 to form a merged sequence. Returning back to example in FIG. 9, each of the elements 1 2 7 8 in the first sequence is selected and in the second sequence, elements 4 5 6 are selected and joined together resulting in a merged sequence 908 of 1 2 7 8 4 5 6. In one embodiment, the sort mask logic 860 sorts the merged sequence resulting in sorted merged sequence of elements. In one embodiment, the sort mask logic 860 sorts the merged sequence using the sorting module 110 and 210 of FIGS. 1 and 2 as described above. Returning back to example in FIG. 9, the sorted merged sequence 910 is 1 2 4 5 6 7 8.

In one embodiment, the above process is repeated by the identify logic 830, bitonic logic 840, mask logic 850 and sort mask logic 860 for a second set of the n elements from the first sequence and a second set of the n elements from the second sequence. The second set of n elements of the first sorted input sequence may include at least one element from the first set of n elements in the first sequence that was not merged. The second set of n elements of the second sorted sequence may include at least one element from the first set of n elements in the second sequence that was not merged.

Referring back to the example in FIG. 9, the second set of elements identified in the first sequence is 9 14 17 17 and the second set of elements identified in the second sequence is 10 14 17 17. It is noted that element 10 from the first set of the second sequence was not merged and so is identified and included in the second set of the second sequence. The result of the bitonic logic 840 from the identified second set of the elements (as identified by the identity logic 830) from the first sequence is of a mask value 916 of 1 1 1 1 and the result of the bitonic logic 840 from the identified set of the elements (as identified by the identity logic 830) from the second sequence is of a mask value 916 of also 1 1 1 1. As, such, the mask logic 850 selects all the elements 9 14 17 17 from the first sequence and all the elements 10 14 17 17 from the second sequence and joins them into a merged sequence 918 of 9 14 17 17 10 14 17 17. The sort mask logic 860 sorts the merged sequence resulting into a sorted merged sequence 920 of 9 10 14 14 17 17 17 17.

In one embodiment, the above process is repeated by the identify logic 830, bitonic logic 840, mask logic 850 and sort mask logic 860 for the remaining sets of the n elements from the first sorted input sequence and the remaining sets of n elements from the second sorted input sequence until all the elements in the first and the second sequence are merged, sorted, and outputted into a final sorted merged sequence of n elements by the sort mask logic 860. Returning back to example in FIG. 9, the final sorted merged sequence 922 is 1 2 4 5 6 7 8 9 10 14 17 17 17 17 18. Accordingly, two sorted input sequences are merged to create a globally sorted output.

In one embodiment, the permute logic 870 permutes (or shuffles) the final sorted merged sequence of n elements and outputs the permuted sorted merged n elements to one of the registers 140*a-n*. In one embodiment, the one of the registers 140*a-n* is the destination register. In one embodiment, the destination register is same as the source register. In one embodiment, the destination register is different from the source register. In one embodiment, the permute logic 870 assigns a position for each of the sorted merged n elements in the destination register, which corresponds to the position for each of the sorted n elements in the source register and pushes the sorted merged n elements to their corresponding positions in the destination register.

Figure 10:
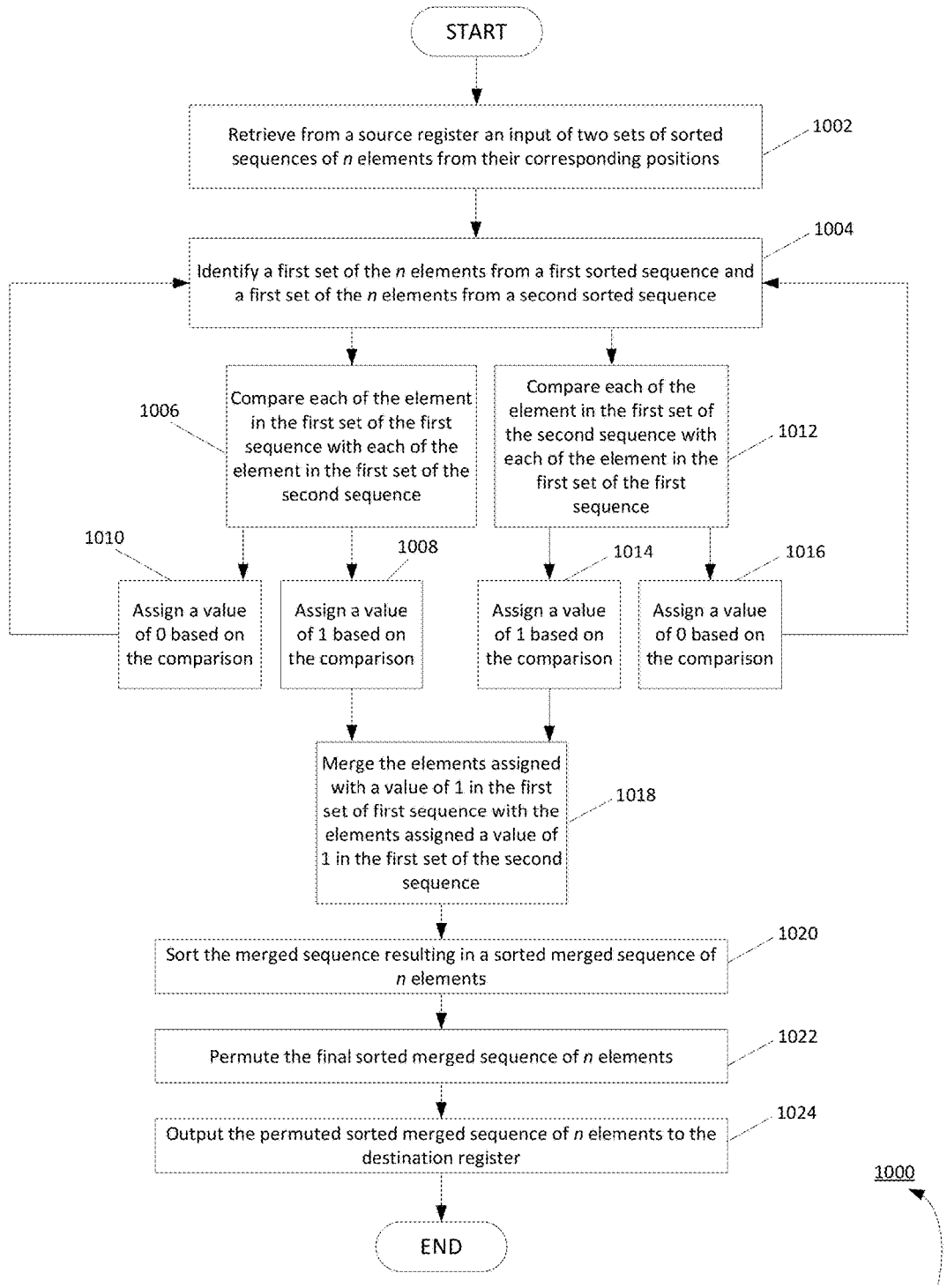
FIG. 10 is a flow diagram illustrating a method for merging in an instruction set architecture execution environment according to an embodiment of the disclosure.

FIG. 10 is a flow diagram of a method 1000 for merging data in an instruction set architecture environment of a processing device according to an embodiment of the disclosure. Method 1000 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 1000 may be performed, in part, by sorting module 110 and 210 described above with respect to FIGS. 1 and 2.

For simplicity of explanation, the method 1000 is depicted and described as a series of acts. However, acts in accordance with this disclosure can occur in various orders and/or concurrently and with other acts not presented and described herein. Furthermore, not all illustrated acts may be performed to implement the method 1000 in accordance with the disclosed subject matter. In addition, those skilled in the art will understand and appreciate that the method 1000 could alternatively be represented as a series of interrelated states via a state diagram or events.

At block 1002, the processing logic retrieves from a source register an input of two sets of sorted sequence of n data elements (elements) from their corresponding positions. At block 1004, identify a first set of the n elements from a first sorted input sequence and a first set of the n elements from the second sorted input sequence. At block 1006, each of the element in the first set of the first sequence is compared with each of the element in the first set of the first sequence. At block 1008 a value of 1 is assigned to an element in the first set of the first sequence based on the comparison done at block 1006. In one embodiment, the sequence is merged in ascending order such that the value of 1 is assigned to the element in the first set in the first sequence when it is determined that the element in the first set of the first sequence is greater than or equal to at least one of the elements in the first set in the second sequence. In another embodiment, the sequence is merged in descending order such that the value of 1 is assigned to the element in the first set in the first sequence when it is determined that the element in the first set of the first sequence is less than or equal to at least one of the elements in the first set in the second sequence.

At block 1010, a value of 0 is assigned to the element in the first set in the first sequence based on the comparison at block 1006. In one embodiment, the sequence is merged in ascending order such that the value of 0 is assigned to the element in the first set in the first sequence when it is determined that the element in the first set of the first sequence is not greater than at least one of the elements in the first set in the second sequence. In another embodiment, the sequence is merged in descending order such that the value of 0 is assigned to the element in the first set in the first sequence when it is determined that the element in the first set of the first sequence is not less than at least one of the elements in the first set in the second sequence.

Then, at block 1012, each of the elements in the first set of the second sequence is compared with each of the element in the first set of the second sequence. Then, at block 1014 a value of 1 is assigned to an element in the first set of the second sequence based on the comparison done at block 1012. In one embodiment, the sequence is merged in ascending order such that the value of 1 is assigned to the element in the first set in the second sequence when it is determined that the element in the first set of the second sequence is greater than or equal to at least one of the element in the first set in the first sequence. In one embodiment, the sequence is merged in descending order such that the value of 1 is assigned to the element in the first set in the second sequence when it is determined that the element in the first set of the second sequence is less than or equal to at least one of the element in the first set in the first sequence.

Then, at block 1016 a value of 0 is assigned to an element in the first set of the second sequence based on the comparison done at block 1012. In one embodiment, the sequence is merged in ascending order such that the value of 0 is assigned to the element in the first set in the second sequence when it is determined that the element in the first set of the second sequence is not greater than at least one of the element in the first set in the first sequence. In one embodiment, the sequence is merged in descending order such that the value of 0 is assigned to the element in the first set in the second sequence when it is determined that the element in the first set of the second sequence is not less than at least one of the element in the first set in the first sequence.

At block 1018, each of the elements assigned with the value of 1 in the first set of the first sequence from block 1008 are merged with each of the elements assigned with the value of 1 in the first set of the second sequence in from block 1014, resulting in merged sequence. At block 1020, the merged sequence is sorted resulting in sorted merged sequence of elements. Accordingly, two sorted input sequences are merged to create a globally sorted output.

The method 1000 is repeated starting from block 1004 for all sets of elements for the first sequence and for all sets of elements for the second sequence including any outputs of block 1010 and block 1016 until a final sorted merged sequence of n elements is outputted at block 1020. At block 1022, the final sorted merged sequence of n elements is permuted. In one embodiment, the permute operation includes assigning a position for each of the sorted merged n elements in the destination register, which corresponds to the position for each of the sorted n elements in the source register At block 1024 the permuted sorted merged sequence of n elements are outputted to the destination register. In one embodiment, the destination register is same as the source register. In one embodiment, the destination register is different from the source register.

Figure 11A:
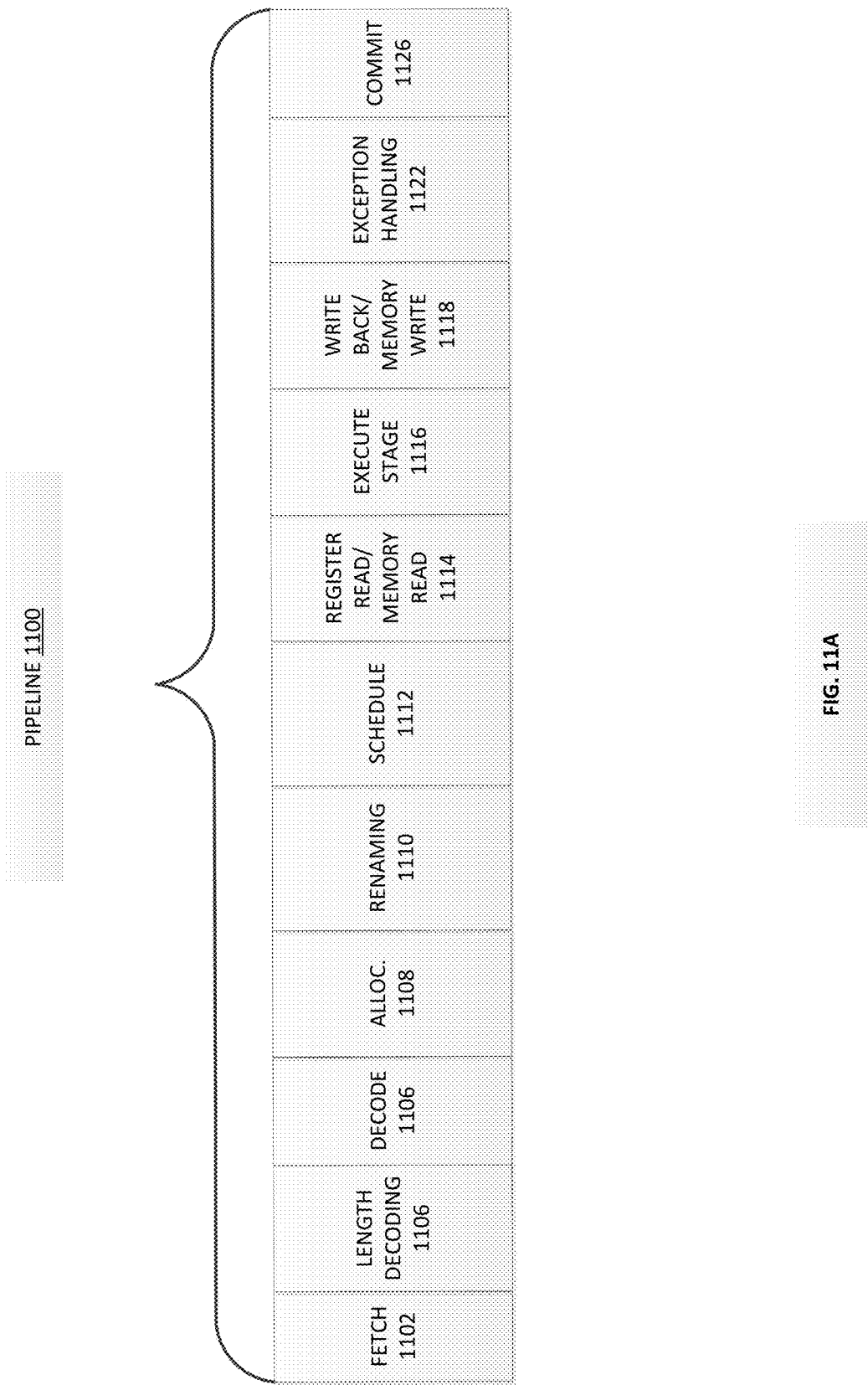
FIG. 11A is a block diagram illustrating a micro-architecture for a processor in which one embodiment of the disclosure may be used.
Figure 11B:
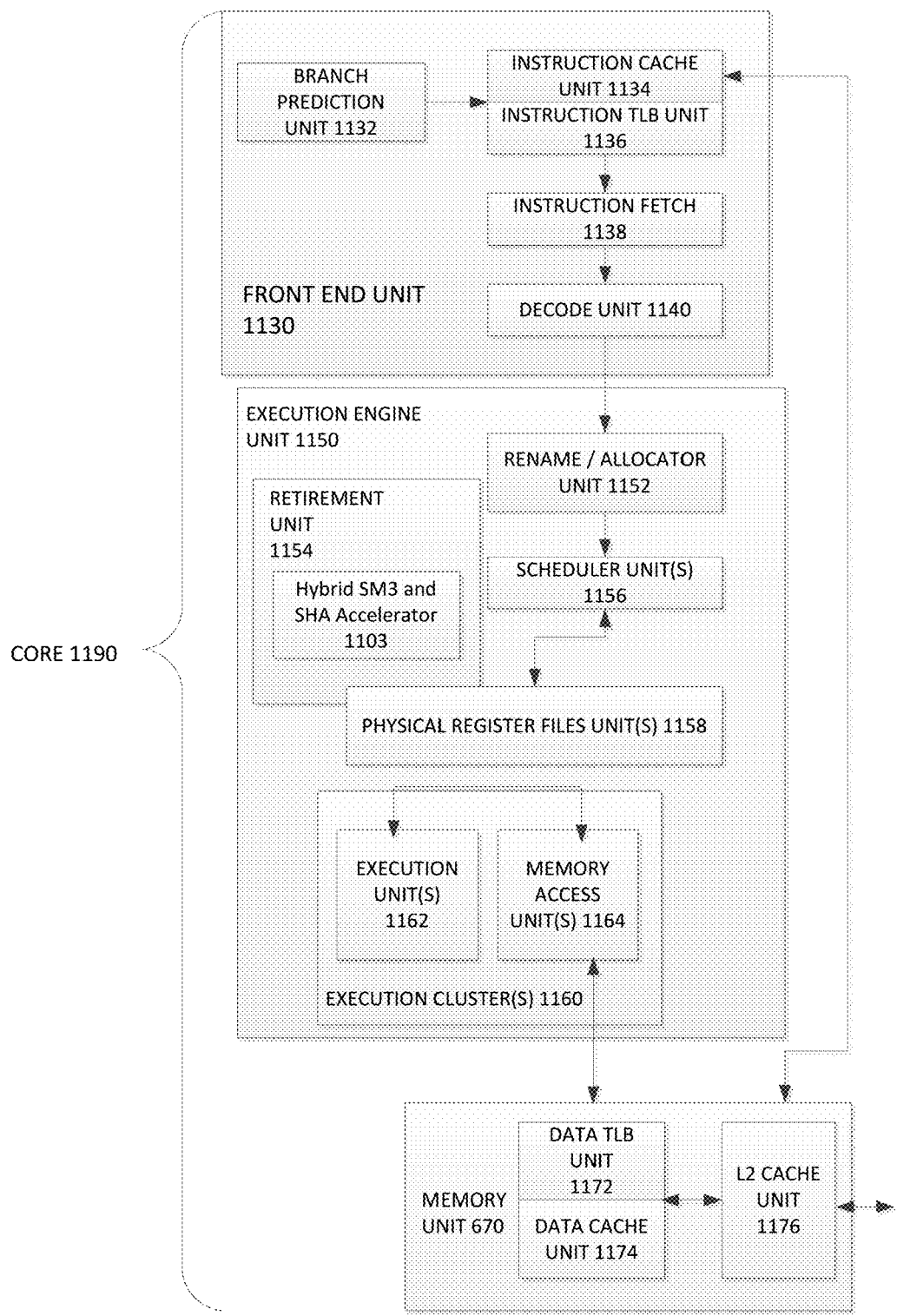
FIG. 11B is a block diagram illustrating an in-order pipeline and a register renaming stage, out-of-order issue/execution pipeline implemented according to at least one embodiment of the disclosure.

FIG. 11A is a block diagram illustrating an in-order pipeline and a register re-naming stage, out-of-order issue/execution pipeline of a processor monitoring performance of a processing device to manage non-precise events according to at least one embodiment of the invention. FIG. 11B is a block diagram illustrating an in-order architecture core and a register renaming logic, out-of-order issue/execution logic to be included in a processor according to at least one embodiment of the invention. The solid lined boxes in FIG. 11A illustrate the in-order pipeline, while the dashed lined boxes illustrates the register renaming, out-of-order issue/execution pipeline. Similarly, the solid lined boxes in FIG. 11B illustrate the in-order architecture logic, while the dashed lined boxes illustrates the register renaming logic and out-of-order issue/execution logic.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124. In some embodiments, the stages are provided in a different order and different stages may be considered in-order and out-of-order.

In FIG. 11B, arrows denote a coupling between two or more units and the direction of the arrow indicates a direction of data flow between those units. FIG. 11B shows processor core 1190 including a front end unit 1130 coupled to an execution engine unit 1150, and both are coupled to a memory unit 70.

The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to a level 2 (L2) cache unit 1176 in the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The retirement unit 1154 may include a merging and sorting module 1103 for sorting data and merging sorted data in instruction set architecture according to embodiments of the invention. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1158 is overlapped by the retirement unit 1154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 38 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 634/674 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
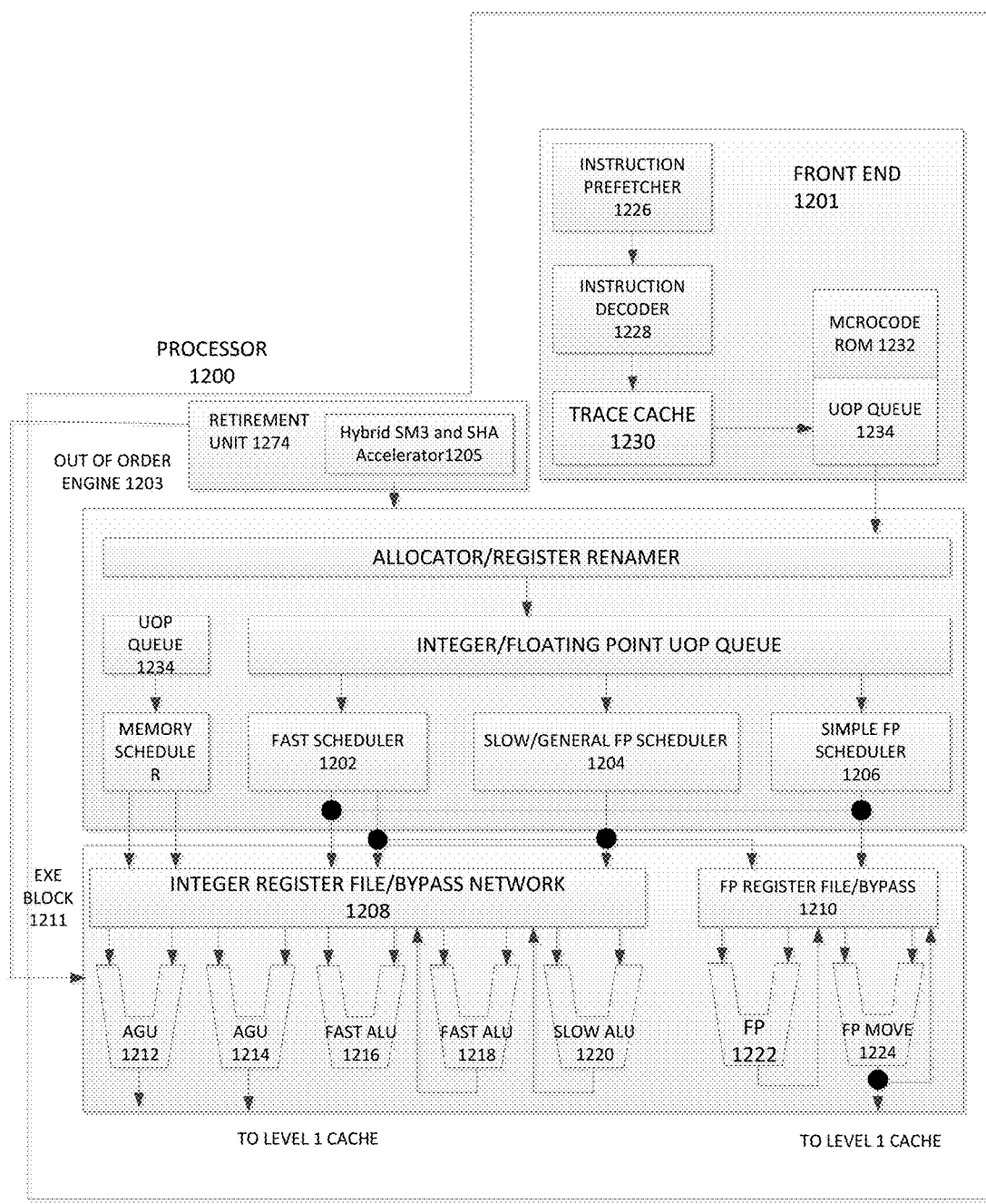
FIG. 12 illustrates a block diagram of the micro-architecture for a processor in accordance with one embodiment of the disclosure.

FIG. 12 is a block diagram illustrating a micro-architecture for a processor 1200 that includes logic circuits to perform instructions in accordance with one embodiment of the invention. In one embodiment, processor 1200 monitors performance of a processing device to manage non-precise events. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1201 is the part of the processor 1200 that fetches instructions to be executed and prepares them to be used later in the processor pipeline. The front end 1201 may include several units. In one embodiment, the instruction prefetcher 1226 fetches instructions from memory and feeds them to an instruction decoder 1228, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 1230 takes decoded uops and assembles them into program ordered sequences or traces in the uop queue 1234 for execution. When the trace cache 1230 encounters a complex instruction, the microcode ROM 1232 provides the uops needed to complete the operation.

Some instructions are converted into a single micro-op, whereas others use several micro-ops to complete the full operation. In one embodiment, if more than four micro-ops are needed to complete an instruction, the decoder 1228 accesses the microcode ROM 1232 to do the instruction. For one embodiment, an instruction can be decoded into a SM3all number of micro ops for processing at the instruction decoder 1228. In another embodiment, an instruction can be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one embodiment from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1202, slow/general floating point scheduler 1204, and simple floating point scheduler 1206. The uop schedulers 1202, 1204, 1206 determine when a uop is ready to execute based on the readiness of their dependent input register operand sources and the availability of the execution resources the uops use to complete their operation. The fast scheduler 1202 of one embodiment can schedule on each half of the main clock cycle while the other schedulers can schedule once per main processor clock cycle. The schedulers arbitrate for the dispatch ports to schedule uops for execution.

Register files 1208, 1210 sit between the schedulers 1202, 1204, 1206, and the execution units 1212, 1214, 1216, 1218, 1220, 1222, 1224 in the execution block 1211. There is a separate register file for integer and floating point operations, respectively. Each register file 1208, 1210, of one embodiment also includes a bypass network that can bypass or forward just completed results that have not yet been written into the register file to new dependent uops. The integer register file 1208 and the floating point register file 1210 are also capable of communicating data with the other. For one embodiment, the integer register file 1208 is split into two separate register files, one register file for the low order 32 bits of data and a second register file for the high order 32 bits of data. The floating point register file 1210 of one embodiment has 128 bit wide entries because floating point instructions typically have operands from 66 to 128 bits in width.

The execution block 1211 contains the execution units 1212, 1214, 1216, 1218, 1220, 1222, 1224, where the instructions are actually executed. This section includes the register files 1208, 1210, that store the integer and floating point data operand values that the micro-instructions use to execute. The processor 1200 of one embodiment is comprised of a number of execution units: address generation unit (AGU) 1212, AGU 1214, fast ALU 1216, fast ALU 1218, slow ALU 1220, floating point ALU 1222, floating point move unit 1224. For one embodiment, the floating point execution blocks 1222, 1224, execute floating point, MMX, SIMD, and SSE, or other operations. The floating point ALU 1222 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 1216, 1218. The fast ALUs 1216, 1218, of one embodiment can execute fast operations with an effective latency of half a clock cycle. For one embodiment, most complex integer operations go to the slow ALU 1220 as the slow ALU 1220 includes integer execution hardware for long latency type of operations, such as a multiplier, shifts, flag logic, and branch processing. Memory load/store operations are executed by the AGUs 1212, 1214. For one embodiment, the integer ALUs 1216, 1218, 1220 are described in the context of performing integer operations on 64 bit data operands. In alternative embodiments, the ALUs 1216, 1218, 1220 can be implemented to support a variety of data bits including 16, 32, 128, 256, etc. Similarly, the floating point units 1222, 1224 can be implemented to support a range of operands having bits of various widths. For one embodiment, the floating point units 1222, 1224 can operate on 128 bits wide packed data operands in conjunction with SIMD and multimedia instructions.

In one embodiment, the uops schedulers 1202, 1204, 1206 dispatch dependent operations before the parent load has finished executing. As uops are speculatively scheduled and executed in processor 1200, the processor 1200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 1200 may include a retirement unit 1254 coupled to the execution block 1211. The retirement unit 1254 may include a merging and sorting module 1205 for sorting data and merging sorted data in instruction set architecture for processing devices.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 13:
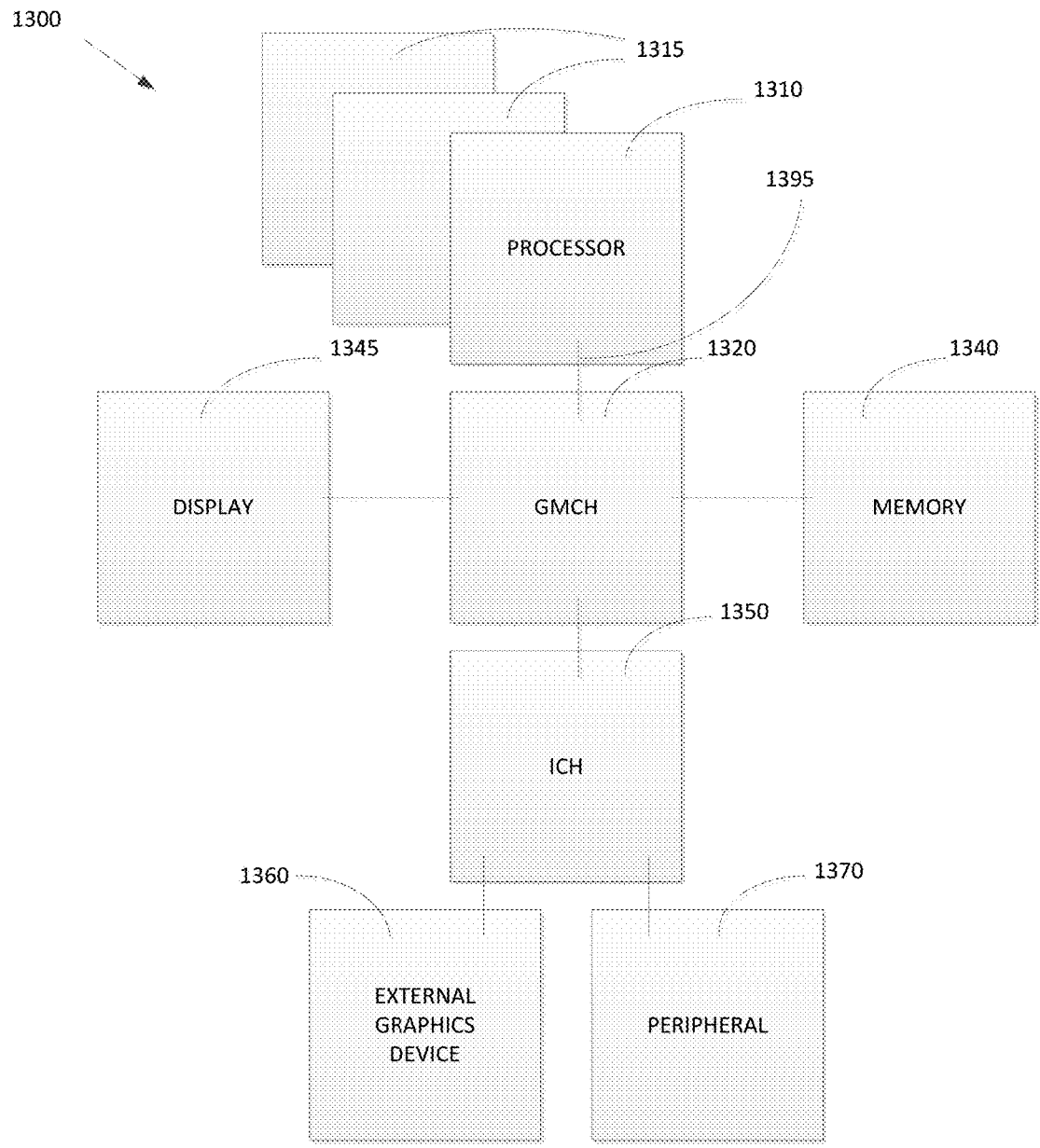
FIG. 13 is a block diagram illustrating a system in which an embodiment of the disclosure may be used.

Referring now to FIG. 13, shown is a block diagram of a system 1300 in accordance with one embodiment of the invention. The system 1300 may include one or more processors 1310, 1315, which are coupled to graphics memory controller hub (GMCH) 1320. The optional nature of additional processors 1315 is denoted in FIG. 13 with broken lines. In one embodiment, a processor 1310, 1315 monitors performance of a processing device to manage non-precise events.

Each processor 1310, 1315 may be some version of the circuit, integrated circuit, processor, and/or silicon integrated circuit as described above. However, it should be noted that it is unlikely that integrated graphics logic and integrated memory control units would exist in the processors 1310, 1315. FIG. 13 illustrates that the GMCH 1320 may be coupled to a memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel or touchscreen display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 13 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the processor(s) 1310, 1315 in terms of a spectrum of metrics of merit including architectural, micro-architectural thermal, power consumption characteristics, and the like. These differences may effectively manifest themselves as asymmetry and heterogeneity amongst the processors 1310, 1315. For at least one embodiment, the various processors 1310, 1315 may reside in the same die package.

Figure 14:
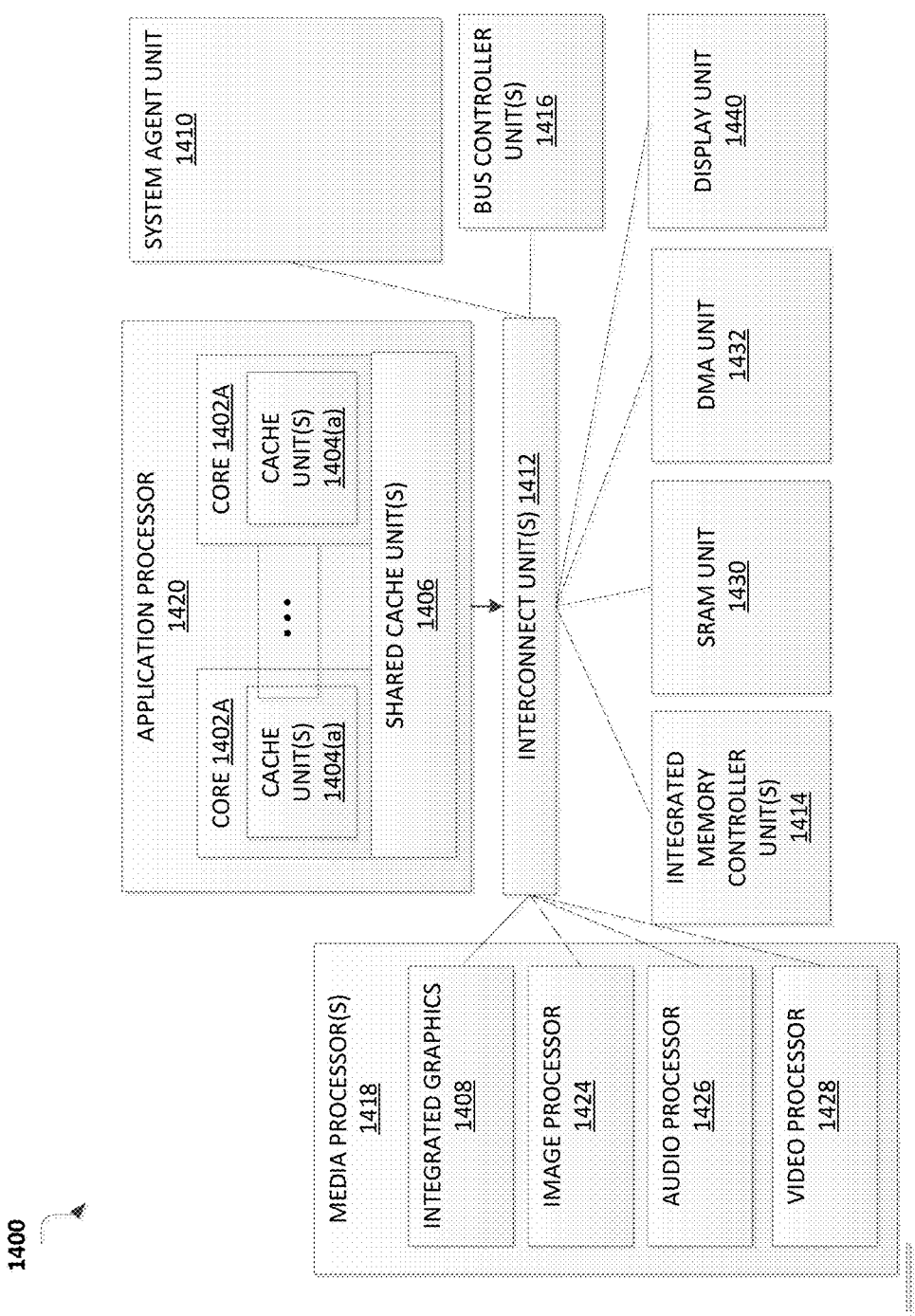
FIG. 14 is a block diagram of a system in which an embodiment of the disclosure may operate.

Embodiments may be implemented in many different system types. FIG. 14 is a block diagram of a SoC 1400 in accordance with an embodiment of the present disclosure. Dashed lined boxes are optional features on more advanced SoCs. In FIG. 14, an interconnect unit(s) 1412 is coupled to: an application processor 1420 which includes a set of one or more cores 1402A-N and shared cache unit(s) 1406; a system agent unit 1410; a bus controller unit(s) 1416; an integrated memory controller unit(s) 1414; a set or one or more media processors 1418 which may include integrated graphics logic 1408, an image processor 1424 for providing still and/or video camera functionality, an audio processor 1426 for providing hardware audio acceleration, and a video processor 1428 for providing video encode/decode acceleration; an static random access memory (SRAM) unit 1430; a direct memory access (DMA) unit 1432; and a display unit 1440 for coupling to one or more external displays. In one embodiment, a memory module may be included in the integrated memory controller unit(s) 1414. In another embodiment, the memory module may be included in one or more other components of the SoC 1400 that may be used to access and/or control a memory. The application processor 1420 may include a conditional branch, indirect branch and event execution logics as described in embodiments herein.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof.

In some embodiments, one or more of the cores 1402A-N are capable of multi-threading.

The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture and/or instruction set. For example, some of the cores 1402A-N may be in order while others are out-of-order. As another example, two or more of the cores 1402A-N may be capable of execution the same instruction set, while others may be capable of executing only a subset of that instruction set or a different instruction set.

The application processor 1420 may be a general-purpose processor, such as a Core™ i3, i5, i7, 2 Duo and Quad, Xeon™, Itanium™, Atom™, XScale™ or StrongARM™ processor, which are available from Intel™ Corporation, of Santa Clara, Calif. Alternatively, the application processor 1420 may be from another company, such as ARM Holdings™, Ltd, MIPS™, etc. The application processor 1420 may be a special-purpose processor, such as, for example, a network or communication processor, compression engine, graphics processor, co-processor, embedded processor, or the like. The application processor 1420 may be implemented on one or more chips. The application processor 1420 may be a part of and/or may be implemented on one or more substrates using any of a number of process technologies, such as, for example, BiCMOS, CMOS, or NMOS.

Figure 15:
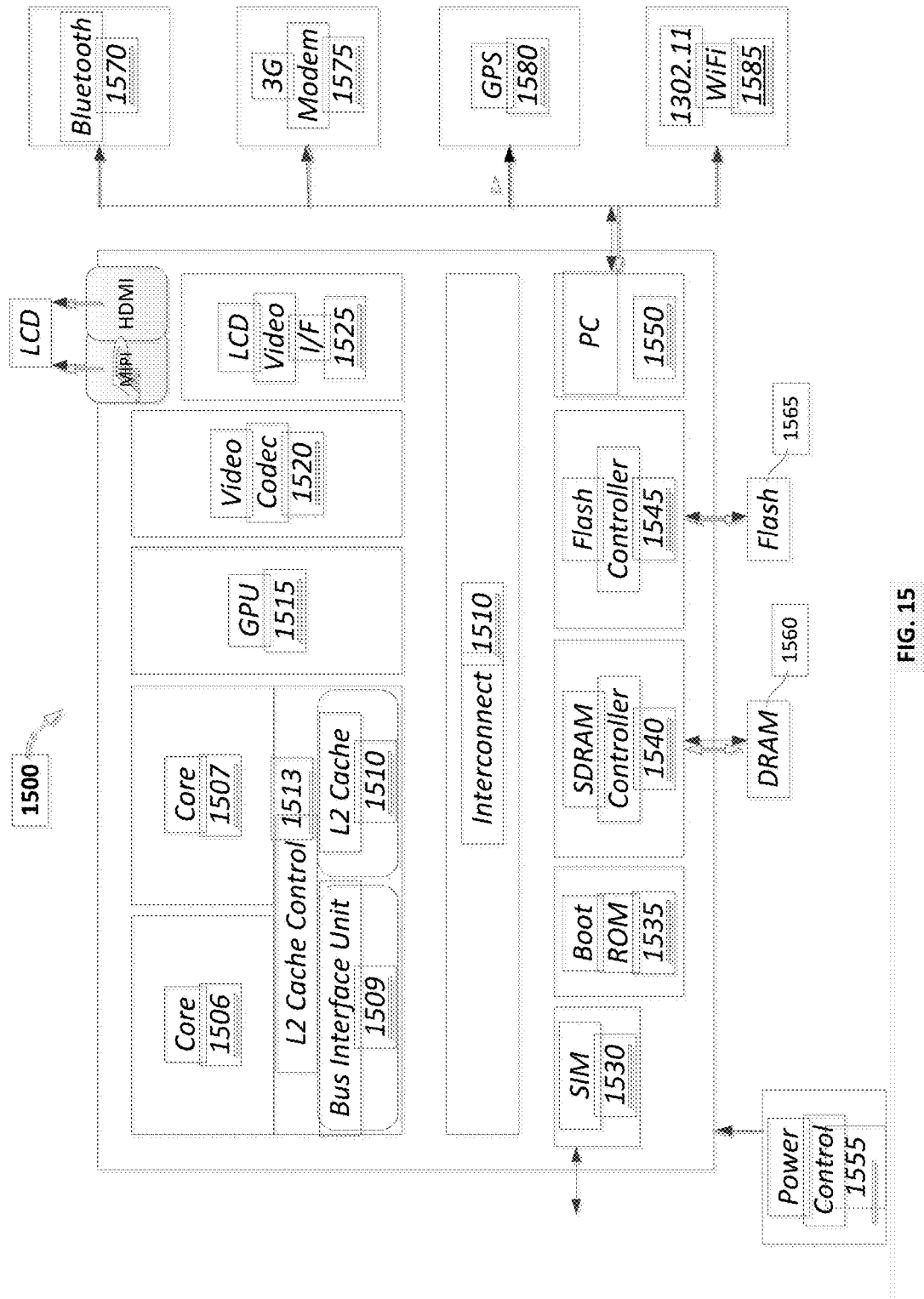
FIG. 15 is a block diagram of a system in which an embodiment of the disclosure may operate.

FIG. 15 is a block diagram of an embodiment of a system on-chip (SoC) design in accordance with the present disclosure. As a specific illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1500 includes 2 cores—1506 and 1507. Cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1508 and L2 cache 1510 to communicate with other parts of system 1500. Interconnect 1510 includes an on-chip interconnect, such as an IOSF, AMBA, or other interconnect discussed above, which potentially implements one or more aspects of the described disclosure. In one embodiment, a conditional branch, indirect branch and event execution logics may be included in cores 1506, 1507.

Interconnect 1510 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the disclosure described herein. In addition, the system 1500 illustrates peripherals for communication, such as a Bluetooth module 1570, 3G modem 1575, GPS 1580, and Wi-Fi 1585.

Figure 16:
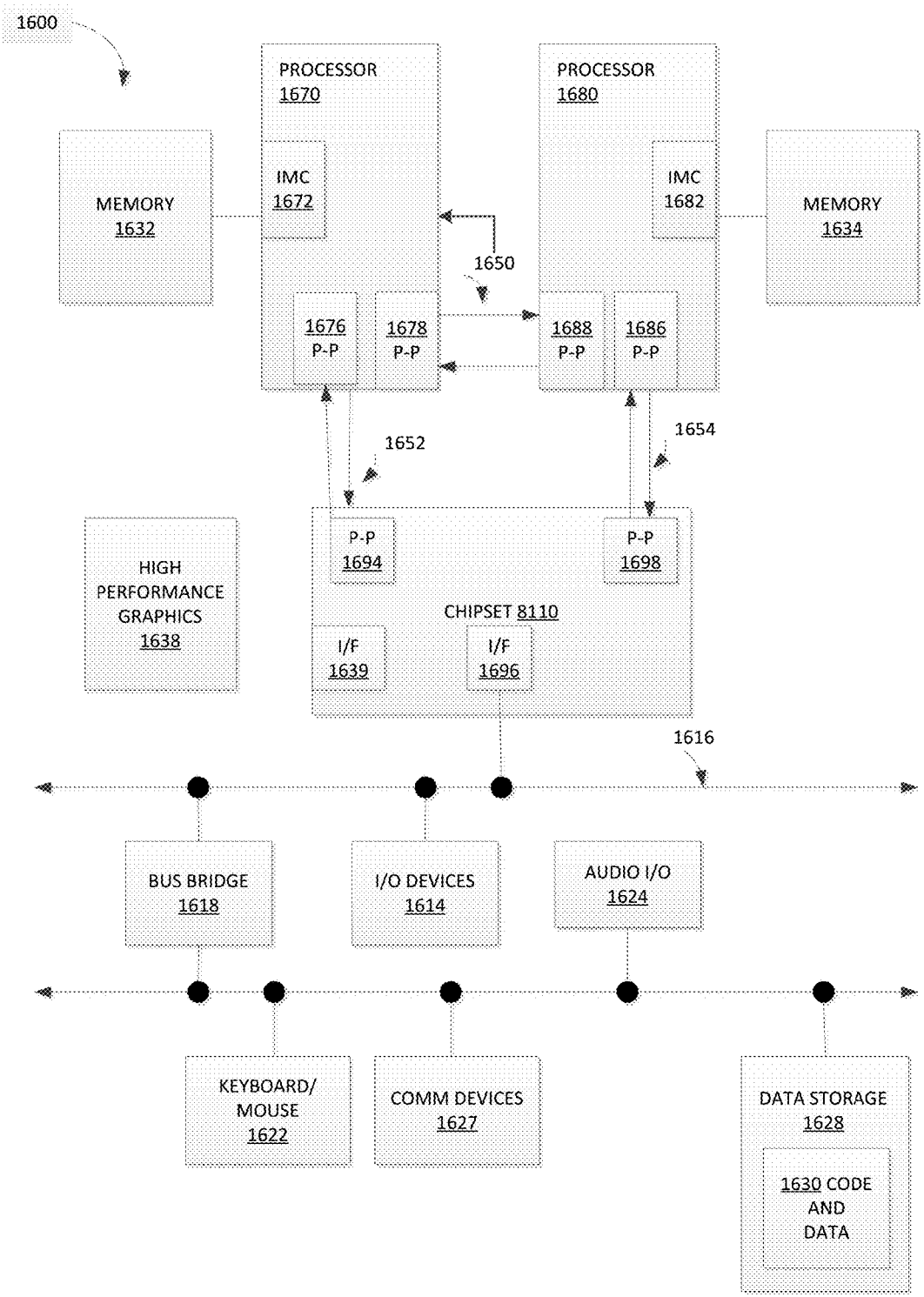
FIG. 16 is a block diagram of a System-on-a-Chip (SoC) in accordance with an embodiment of the present disclosure.

Referring now to FIG. 16, shown is a block diagram of a system 1600 in accordance with an embodiment of the invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processors of the computing systems as described herein. In one embodiment, processors 1670, 1680 monitoring performance of a processing device to manage non-precise events to monitor performance of a processing device to manage non-precise events.

While shown with two processors 1670, 1680, it is to be understood that the scope of the disclosure is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670 and 1680 may each exchange information with a chipset 1690 via individual P-P interfaces 1652, 1654 using point to point interface circuits 1676, 1694, 1686, 1698. Chipset 1690 may also exchange information with a high-performance graphics circuit 1638 via a high-performance graphics interface 1639.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1616. In one embodiment, first bus 1616 may be a Peripheral Component Interconnect (PCI) bus, or a bus such as a PCI Express bus or another third generation I/O interconnect bus, although the scope of the disclosure is not so limited.

As shown in FIG. 16, various I/O devices 1614 may be coupled to first bus 1616, along with a bus bridge 1618, which couples first bus 1616 to a second bus 1620. In one embodiment, second bus 1620 may be a low pin count (LPC) bus. Various devices may be coupled to second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to second bus 1620. Note that other architectures are possible. For example, instead of the point-to-point architecture of FIG. 16, a system may implement a multi-drop bus or other such architecture.

Figure 17:
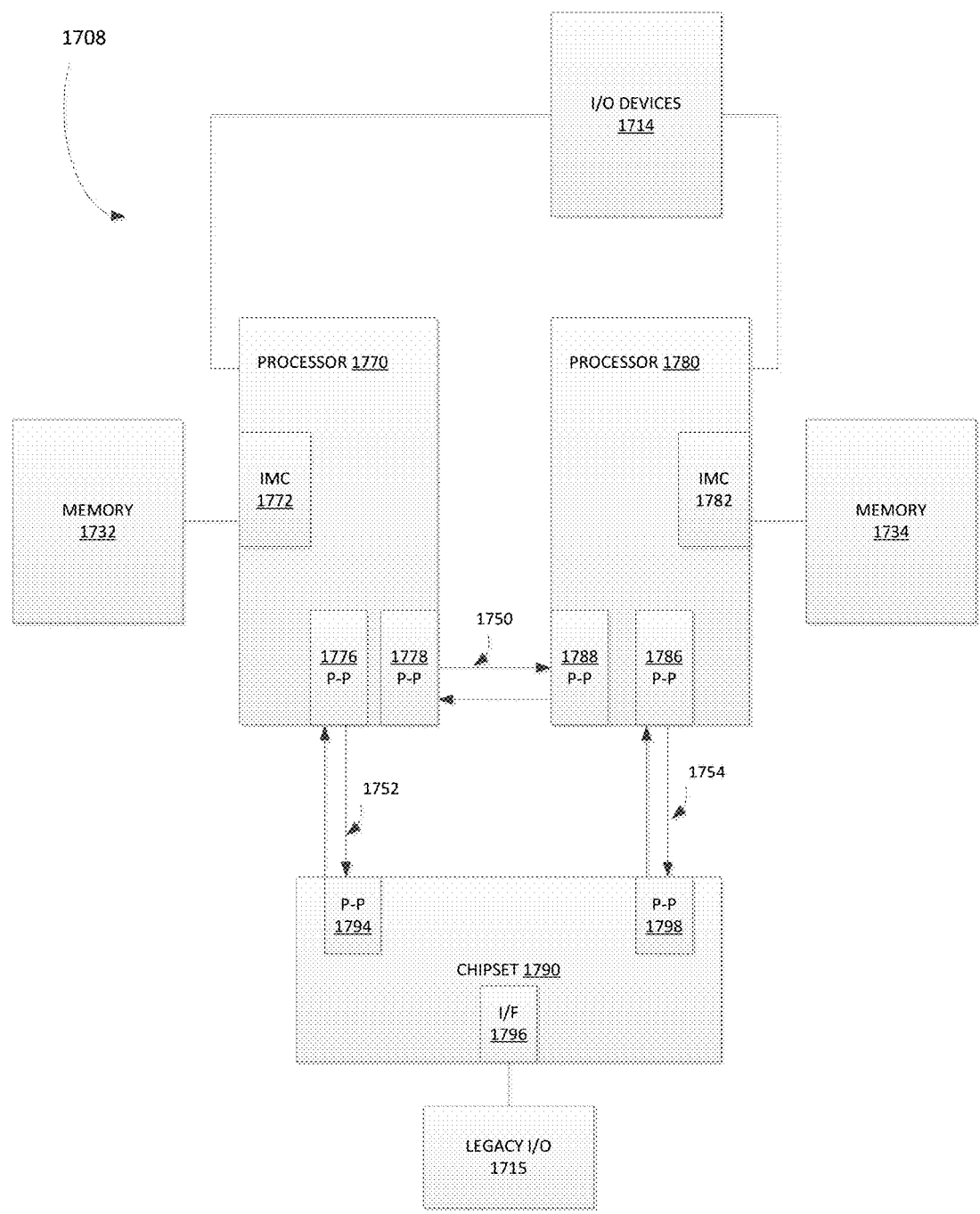
FIG. 17 is a block diagram of an embodiment of an SoC design in accordance with the present disclosure.

Referring now to FIG. 17, shown is a block diagram of a system 1700 in accordance with an embodiment of the invention. FIG. 17 illustrates processors 1770, 1780. In one embodiment, processors 1770, 1780 monitor performance of a processing device to manage non-precise events. Furthermore, processors 1770, 1780 may include integrated memory and I/O control logic ("CL") 1772 and 1782, respectively and intercommunicate with each other via point-to-point interconnect 1750 between point-to-point (P-P) interfaces 1778 and 1788 respectively. Processors 1770, 1780 each communicate with chipset 1790 via point-to-point interconnect 1752 and 1754 through the respective P-P interfaces 1776 to 1794 and 1786 to 1798 as shown. For at least one embodiment, the CL 1772, 1782 may include integrated memory controller units. CLs 1772, 1782 may include I/O control logic. As depicted, memories 1732, 1734 coupled to CLs 1772, 1782 and I/O devices 1714 are also coupled to the control logic 1772, 1782. Legacy I/O devices 1715 are coupled to the chipset 1790 via interface 1796.

Figure 18:
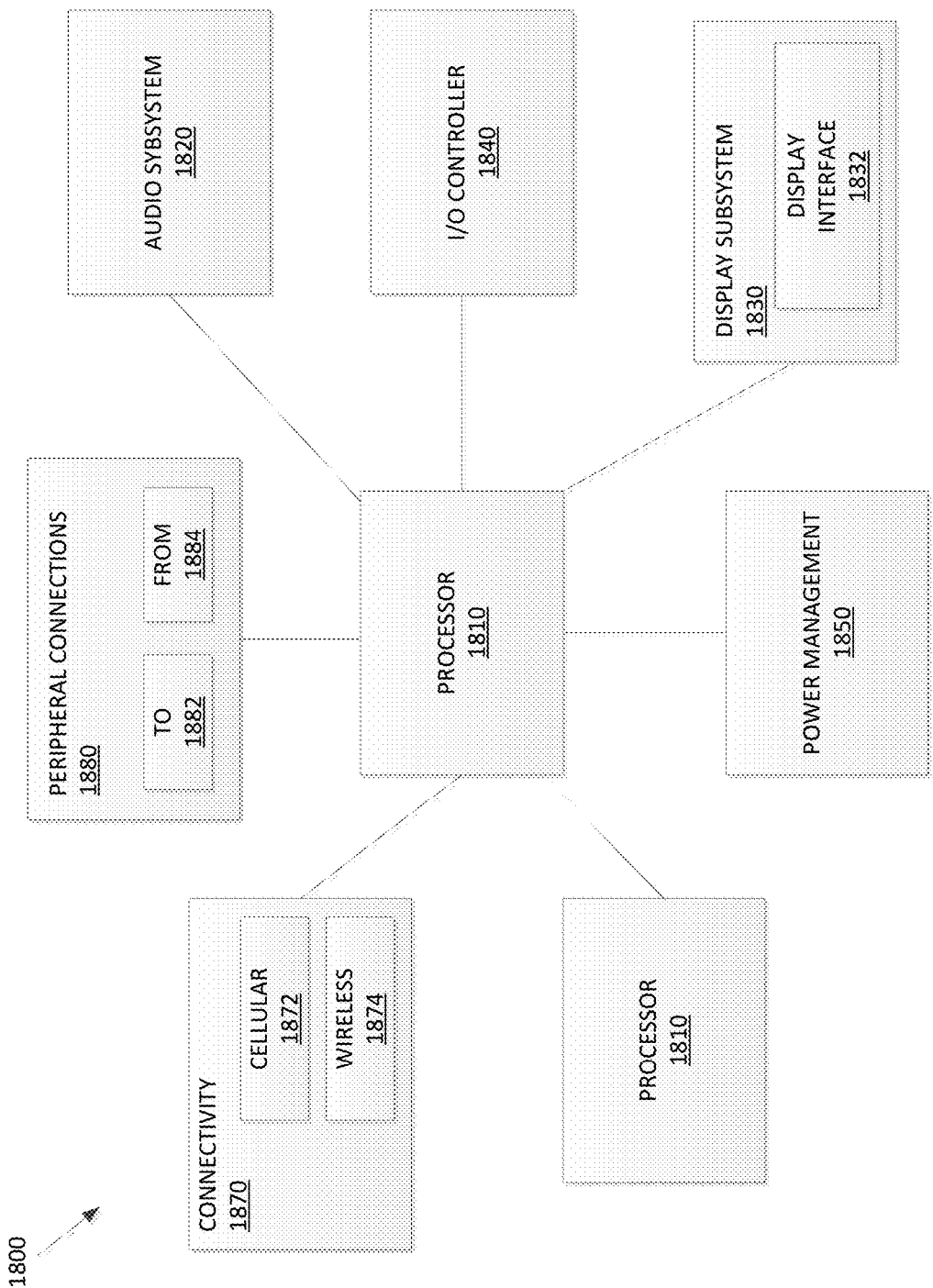
FIG. 18 illustrates a block diagram of one embodiment of a computer system.

FIG. 18 illustrates a block diagram 1800 of an embodiment of tablet computing device, a smartphone, or other mobile device in which touchscreen interface connectors may be used. Processor 1810 may monitor performance of a processing device to manage non-precise events. In addition, processor 1810 performs the primary processing operations. Audio subsystem 1820 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1810.

Display subsystem 1832 represents hardware (e.g., display devices) and software (e.g., drivers) components that provide a visual and/or tactile display for a user to interact with the tablet computing device or smartphone. Display subsystem 1830 includes display interface 1832, which includes the particular screen or hardware device used to provide a display to a user. In one embodiment, display subsystem 1830 includes a touchscreen device that provides both output and input to a user.

I/O controller 1840 represents hardware devices and software components related to interaction with a user. I/O controller 1840 can operate to manage hardware that is part of audio subsystem 1820 and/or display subsystem 1830. Additionally, I/O controller 1840 illustrates a connection point for additional devices that connect to the tablet computing device or smartphone through which a user might interact. In one embodiment, I/O controller 1840 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1850 that manages battery power usage, charging of the battery, and features related to power saving operation. Memory subsystem 1860 includes memory devices for storing information in the tablet computing device or smartphone. Connectivity 1870 includes hardware devices (e.g., wireless and/or wired connectors and communication hardware) and software components (e.g., drivers, protocol stacks) to the tablet computing device or smartphone to communicate with external devices. Cellular connectivity 1872 may include, for example, wireless carriers such as GSM (global system for mobile communications), CDMA (code division multiple access), TDM (time division multiplexing), or other cellular service standards). Wireless connectivity 1874 may include, for example, activity that is not cellular, such as personal area networks (e.g., Bluetooth), local area networks (e.g., WiFi), and/or wide area networks (e.g., WiMax), or other wireless communication.

Peripheral connections 1880 include hardware interfaces and connectors, as well as software components (e.g., drivers, protocol stacks) to make peripheral connections as a peripheral device ("to" 1882) to other computing devices, as well as have peripheral devices ("from" 1884) connected to the tablet computing device or smartphone, including, for example, a "docking" connector to connect with other computing devices. Peripheral connections 1880 include common or standards-based connectors, such as a Universal Serial Bus (USB) connector, DisplayPort including MiniDisplayPort (MDP), High Definition Multimedia Interface (HDMI), Firewire, etc.

Figure 19:
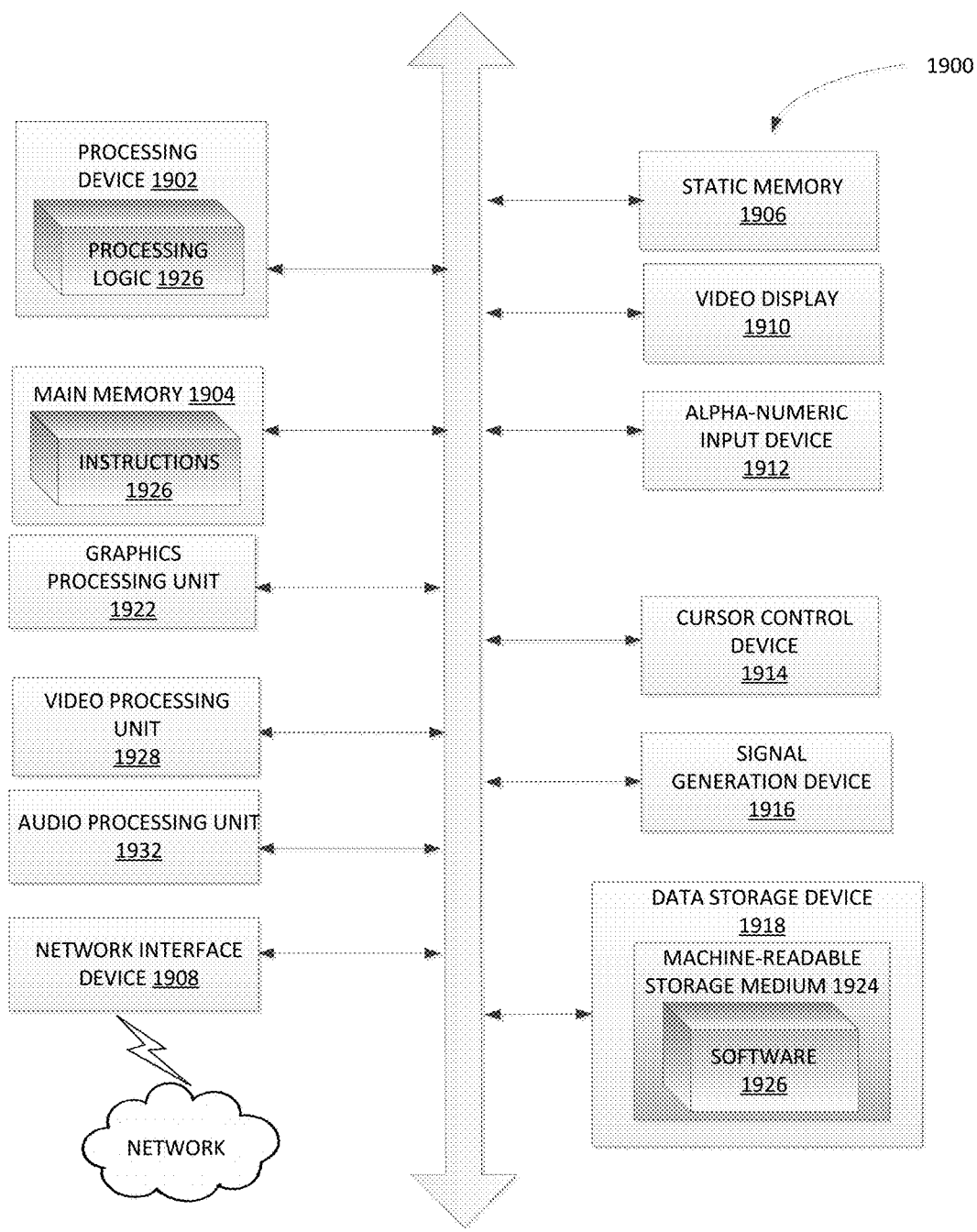
FIG. 19 illustrates a block diagram of a machine in form of a computing system in accordance with the present disclosure.

FIG. 19 illustrates a diagrammatic representation of a machine in the example form of a computing system 1900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1900 includes a processing device 1902, a main memory 1904 (e.g., read-only memory (ROM), flash memory, dynamic random access memory (DRAM) (such as synchronous DRAM (SDRAM) or DRAM (RDRAM), etc.), a static memory 1906 (e.g., flash memory, static random access memory (SRAM), etc.), and a data storage device 1918, which communicate with each other via a bus 1930.

Processing device 1902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1902 may also be one or more special-purpose processing devices such as an application specific integrated circuit (ASIC), a field programmable gate array (FPGA), a digital signal processor (DSP), network processor, or the like. In one embodiment, processing device 1902 may include one or processing cores. The processing device 1902 is configured to execute the processing logic 1926 for performing the operations discussed herein. In one embodiment, processing device 1902 is the same as computer system 100 as described with respect to FIG. 1 that implements the sorting module 103 and the merging module 105. Alternatively, the computing system 1900 can include other components as described herein.

The computing system 1900 may further include a network interface device 1908 communicably coupled to a network 1920. The computing system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), a signal generation device 1916 (e.g., a speaker), or other peripheral devices. Furthermore, computing system 1900 may include a graphics processing unit 1922, a video processing unit 1928 and an audio processing unit 1932. In another embodiment, the computing system 1900 may include a chipset (not illustrated), which refers to a group of integrated circuits, or chips, that are designed to work with the processing device 1902 and controls communications between the processing device 1902 and external devices. For example, the chipset may be a set of chips on a motherboard that links the processing device 1902 to very high-speed devices, such as main memory 1904 and graphic controllers, as well as linking the processing device 1902 to lower-speed peripheral buses of peripherals, such as USB, PCI or ISA buses.

The data storage device 1918 may include a computer-readable storage medium 1924 on which is stored software 1926 embodying any one or more of the methodologies of functions described herein. The software 1926 may also reside, completely or at least partially, within the main memory 1904 as instructions 1926 and/or within the processing device 1902 as processing logic 1926 during execution thereof by the computing system 1900; the main memory 1904 and the processing device 1902 also constituting computer-readable storage media.

The computer-readable storage medium 1924 may also be used to store instructions 1926 utilizing the sorting module 103 and merging module 105 described with respect to FIG. 1 and/or a software library containing methods that call the above applications. While the computer-readable storage medium 1924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing device comprising a sorting module to add to each of a plurality of elements a position value of a corresponding position in a register set resulting in a plurality of transformed elements in corresponding positions, wherein each of the plurality of elements comprise a plurality of bits; compare each of the plurality of transformed elements to itself and to one another; assign one of an enabled or disabled indicator to each of the plurality of the transformed elements based on the comparison; and count a number of the enabled indicators assigned to each of the plurality of the transformed elements to generate a sorted sequence of the plurality of elements.

In Example 2, the subject matter of Example 1 can optionally include sorting module to left shift each of the plurality of elements in each of the corresponding positions by a set of bits when at least a value of one element among the plurality of elements is same as a value of other element among the plurality of elements.

In Example 3, the subject matter of Examples 1-2 can optionally include wherein the sorted sequence comprises the count of number of enabled indicators and the sorting module to generate the sorted sequence of the plurality of elements in one of an ascending order or a descending order.

In Example 4, the subject matter of Examples 1-3 can optionally include wherein the sorting module to compare each of the plurality of transformed elements further comprises the sorting module to perform a less than operation.

In Example 5, the subject matter of Examples 1-4 can optionally include wherein the sorting module to compare each of the plurality of transformed elements further comprises the sorting module to perform a greater than operation.

In Example 6, the subject matter of Examples 1-5 can optionally include wherein the sorting module to generate at least a first set of the sorted sequence of the plurality of sorted elements and second set of the sorted sequence of the plurality of sorted elements.

In Example 7, the subject matter of Examples 1-6 can optionally include further comprising a merging module coupled to the sorting module, wherein the merging module to divide the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence; compare each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and generate the position value of the corresponding position of each of the plurality of elements in the third set of the sequence as a merged sorted sequence.

In Example 8, the subject matter of Examples 1-7 can optionally include further comprising a merging module coupled to the sorting module, wherein the merging module to identify one sets of the plurality of sorted elements from the first set of the sorted sequence and another sets of the plurality of sorted elements from the second set of the sorted sequence; compare each of the plurality of the sorted elements in each of the identified one sets from the first sequence of the sorted sequence with each of the plurality of the sorted elements in each of the identified other sets from the second set of the sorted sequence; select the sorted elements from each of the identified one sets from the first sequence of the sorted sequence based on the comparison; compare each of the plurality of the sorted elements in each of the identified other sets from the second sequence of the sorted sequence with each of the plurality of the sorted elements in each of the identified one sets from the first set of the sorted sequence; and select the sorted elements from each of the identified other sets from the second sequence of the sorted sequence based on the comparison.

In Example 9, the subject matter of Examples 1-8 can optionally include wherein the merging module to join the selected sorted elements from each of the identified one sets from the first sequence of sorted sequence with the selected sorted elements from each of the identified other sets from the second sequence of the sorted sequence to generate a merged sequence comprising the combined selected sorted elements; and place the combined selected sorted elements in an order to generate a merged sorted sequence.

In Example 10, the subject matter of Examples 1-9 can optionally include wherein the merging module to generate the merged sorted sequence in one of an ascending order or a descending order.

Example 11 is a system-on-a chip (SoC) comprising a memory and a processing device, communicatively coupled to the memory, comprising a sorting module to add to each of a plurality of elements a position value of a corresponding position in a register set resulting in a plurality of transformed elements in corresponding positions, wherein each of the plurality of elements comprise a plurality of bits; compare each of the plurality of transformed elements to itself and to one another; assign one of an enabled or disabled indicator to each of the plurality of the transformed elements based on the comparison; and count a number of the enabled indicators assigned to each of the plurality of the transformed elements to generate a sorted sequence of the plurality of elements.

In Example 12, the subject matter of Example 11 can optionally include sorting module to left shift each of the plurality of elements in each of the corresponding positions by a set of bits when at least a value of one element among the plurality of elements is same as a value of other element among the plurality of elements.

In Example 13, the subject matter of Examples 11-12 can optionally include wherein the sorted sequence comprises the count of number of enabled indicators and wherein the sorting module to generate at least a first set of the sorted sequence of the plurality of sorted elements and second set of the sorted sequence of the plurality of sorted elements.

In Example 14, the subject matter of Examples 11-13 can optionally include wherein the processing device further comprising a merging module coupled to the sorting module, wherein the merging module to divide the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence; compare each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and generate the position value of the corresponding position of each of the plurality of elements in the third set of the sequence as a merged sorted sequence.

In Example 15, the subject matter of Examples 11-14 can optionally include wherein the processing device further comprising a merging module coupled to the sorting module, wherein the merging module to identify one sets of the plurality of sorted elements from the first set of the sorted sequence and another sets of the plurality of sorted elements from the second set of the sorted sequence; compare each of the plurality of the sorted elements in each of the identified one sets from the first sequence of the sorted sequence with each of the plurality of the sorted elements in each of the identified another sets from the second set of the sorted sequence; select the sorted elements from each of the identified one sets from the first sequence of the sorted sequence based on the comparison; compare each of the plurality of the sorted elements in each of the identified other sets from the second sequence of the sorted sequence with each of the plurality of the sorted elements in each of the identified one sets from the first set of the sorted sequence; select the sorted elements from each of the identified other sets from the second sequence of the sorted sequence based on the comparison; join the selected sorted elements from each of the identified one sets from the first sequence of sorted sequence with the selected sorted elements from each of the identified other sets from the second sequence of the sorted sequence to generate a merged sequence comprising the combined selected sorted elements; and place the combined selected sorted elements in an order to generate a merged sorted sequence.

Example 16 is a method comprising adding to each of a plurality of elements a position value of a corresponding position in a register set resulting in a plurality of transformed elements in corresponding positions, wherein each of the plurality of elements comprise a plurality of bits; comparing each of the plurality of transformed elements to itself and to one another; assigning one of an enabled or disabled indicator to each of the plurality of the transformed elements based on the comparison; and counting a number of the enabled indicators assigned to each of the plurality of the transformed elements to generate a sorted sequence of the plurality of elements.

In Example 17, the subject matter of Example 16 can optionally include wherein the sorted sequence comprises the count of number of enabled indicators.

In Example 18, the subject matter of Examples 16-17 can optionally include further comprising shifting each of the plurality of elements to a left position in each of the corresponding positions when at least a value of one element among the plurality of elements is same as a value of other element among the plurality of elements; and generating at least a first set of the sorted sequence of the plurality of sorted elements and second set of the sorted sequence of the plurality of sorted elements.

In Example 19, the subject matter of Examples 16-18 can optionally include dividing the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence; comparing each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and generating the position value of the corresponding position of each of the plurality of elements in the third set of the sequence as a merged sorted sequence.

In Example 20, the subject matter of Examples 16-19 can optionally include identifying one sets of the plurality of sorted elements from the first set of the sorted sequence and another sets of the plurality of sorted elements from the second set of the sorted sequence; comparing each of the plurality of the sorted elements in each of the identified one sets from the first sequence of the sorted sequence with each of the plurality of the sorted elements in each of the identified another sets from the second set of the sorted sequence; selecting the sorted elements from each of the identified one sets from the first sequence of the sorted sequence based on the comparison; comparing each of the plurality of the sorted elements in each of the identified other sets from the second sequence of the sorted sequence with each of the plurality of the sorted elements in each of the identified one sets from the first set of the sorted sequence; selecting the sorted elements from each of the identified other sets from the second sequence of the sorted sequence based on the comparison; joining the selected sorted elements from each of the identified one sets from the first sequence of sorted sequence with the selected sorted elements from each of the identified other sets from the second sequence of the sorted sequence to generate a merged sequence comprising the combined selected sorted elements; and placing the combined selected sorted elements in an order to generate a merged sorted sequence.

Example 21 is a non-transitory machine-readable storage medium including instructions that, when accessed by a processing device, cause the processing device to perform operations comprising adding to each of a plurality of elements a position value of a corresponding position in a register set resulting in a plurality of transformed elements in corresponding positions, wherein each of the plurality of elements comprise a plurality of bits; comparing each of the plurality of transformed elements to itself and to one another; assigning one of an enabled or disabled indicator to each of the plurality of the transformed elements based on the comparison; and counting a number of the enabled indicators assigned to each of the plurality of the transformed elements to generate a sorted sequence of the plurality of elements.

In Example 22, the subject matter of Example 21 can optionally include wherein the sorted sequence comprises the count of number of enabled indicators.

In Example 23, the subject matter of Examples 21-22 can optionally include wherein the operations further comprising shifting each of the plurality of elements to a left position in each of the corresponding positions when at least a value of one element among the plurality of elements is same as a value of other element among the plurality of elements; and generating at least a first set of the sorted sequence of the plurality of sorted elements and second set of the sorted sequence of the plurality of sorted elements.

In Example 24, the subject matter of Examples 21-23 can optionally include wherein the operations further comprising dividing the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence; comparing each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and generating the position value of the corresponding position of each of the plurality of elements in the third set of the sequence as a merged sorted sequence.

In Example 25, the subject matter of Examples 21-24 can optionally include wherein the operations further comprising identifying one sets of the plurality of sorted elements from the first set of the sorted sequence and another sets of the plurality of sorted elements from the second set of the sorted sequence; comparing each of the plurality of the sorted elements in each of the identified one sets from the first sequence of the sorted sequence with each of the plurality of the sorted elements in each of the identified another sets from the second set of the sorted sequence; selecting the sorted elements from each of the identified one sets from the first sequence of the sorted sequence based on the comparison; comparing each of the plurality of the sorted elements in each of the identified other sets from the second sequence of the sorted sequence with each of the plurality of the sorted elements in each of the identified one sets from the first set of the sorted sequence; selecting the sorted elements from each of the identified other sets from the second sequence of the sorted sequence based on the comparison; joining the selected sorted elements from each of the identified one sets from the first sequence of sorted sequence with the selected sorted elements from each of the identified other sets from the second sequence of the sorted sequence to generate a merged sequence comprising the combined selected sorted elements; and placing the combined selected sorted elements in an order to generate a merged sorted sequence.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A processing device comprising:
a set of registers to store a plurality of elements, wherein each of the plurality of elements comprise a plurality of bits; and
sorting circuitry communicably coupled to the set of registers, the sorting circuitry comprising:
a crossbar circuit to:
left shift each of the plurality of elements in corresponding positions in the set of registers by a set of bits;

modify each of the left-shifted plurality of elements by a position value of the corresponding position in the set of registers resulting in a plurality of transformed elements in corresponding positions;

compare, via at least one of a greater than or less than operations in the crossbar circuit, each of the plurality of transformed elements to itself and to one another; and assign one of an enabled indicator or a disabled indicator to each of the plurality of the transformed elements based on the comparison; and a counting circuit to count a number of the enabled indicators assigned to each of the plurality of the transformed elements to generate a sorted sequence of the plurality of elements.

2. The processing device of claim 1 wherein the sorting circuitry to left shift each of the plurality of elements responsive to at least a value of one element among the plurality of elements being the same as a value of other element among the plurality of elements.

3. The processing device of claim 1 wherein the sorted sequence comprises the count of number of enabled indicators and the sorting module to generate the sorted sequence of the plurality of elements in one of an ascending order or a descending order.

4. The processing device of claim 3 wherein the sorting circuitry to compare each of the plurality of transformed elements further comprises the sorting module to perform a less than operation.

5. The processing device of claim 3 wherein the sorting circuitry to compare each of the plurality of transformed elements further comprises the sorting circuitry to perform a greater than operation.

6. The processing device of claim 1 wherein the sorting circuitry to generate at least a first set of the sorted sequence of the plurality of sorted elements and second set of the sorted sequence of the plurality of sorted elements.

7. The processing device of claim 6 further comprising a merging circuitry coupled to the sorting circuitry, wherein the merging circuitry to:

divide the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence;

compare each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and generate the position value of the corresponding position of each of the plurality of elements in the third set of the sequence as a merged sorted sequence.

8. The processing device of claim 6 further comprising a merging circuitry coupled to the sorting circuitry, wherein the merging circuitry to:

identify one sets of the plurality of sorted elements from the first set of the sorted sequence and another sets of the plurality of sorted elements from the second set of the sorted sequence;

compare each of the plurality of the sorted elements in each of the identified one sets from the first sequence of the sorted sequence with each of the plurality of the sorted elements in each of the identified other sets from the second set of the sorted sequence;

select the sorted elements from each of the identified one sets from the first sequence of the sorted sequence based on the comparison;

compare each of the plurality of the sorted elements in each of the identified other sets from the second sequence of the sorted sequence with each of the plurality of the sorted elements in each of the identified one sets from the first set of the sorted sequence; and select the sorted elements from each of the identified other sets from the second sequence of the sorted sequence based on the comparison.

9. The processing device of claim 8 wherein the merging circuitry to:

join the selected sorted elements from each of the identified one sets from the first sequence of sorted sequence with the selected sorted elements from each of the identified other sets from the second sequence of the sorted sequence to generate a merged sequence comprising the combined selected sorted elements; and place the combined selected sorted elements in an order to generate a merged sorted sequence.

10. The processing device of claim 9 wherein the merging circuitry to generate the merged sorted sequence in one of an ascending order or a descending order.

11. A system-on-a chip (SoC) comprising:

a memory; and a processing device, communicatively coupled to the memory, comprising:

a set of registers to store a plurality of elements, wherein each of the plurality of elements comprise a plurality of bits; and sorting circuitry communicably coupled to the set of registers, the sorting circuitry comprising:

a crossbar circuit to:

left shift each of the plurality of elements in corresponding positions in the set of registers by a set of bits;

modify to each of the plurality of left-shifted elements a position value of the corresponding position in the set of registers resulting in a plurality of transformed elements in corresponding positions;

compare, via at least one of a greater than or less than operations in the crossbar circuit, each of the plurality of transformed elements to itself and to one another; and assign one of an enabled indicator or a disabled indicator to each of the plurality of the transformed elements based on the comparison; and a counting circuit to count a number of the enabled indicators assigned to each of the plurality of the transformed elements to generate a sorted sequence of the plurality of elements.

12. The SoC of claim 11 wherein the sorting circuitry to left shift each of the plurality of responsive to at least a value of one element among the plurality of elements being the same as a value of other element among the plurality of elements.

13. The SoC of claim 11 wherein the sorted sequence comprises the count of number of enabled indicators and the sorting circuitry to generate the sorted sequence of the plurality of elements in one of an ascending order or a descending order.

14. The SoC of claim 13 wherein the processing device further comprising a merging circuitry coupled to the sorting circuitry, wherein the merging circuitry to:
  divide the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence;
  compare each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and
  generate the position value of the corresponding position of each of the plurality of elements in the third set of the sequence as a merged sorted sequence.

15. The SoC of claim 13 wherein the processing device further comprising a merging circuitry coupled to the sorting circuitry, wherein the merging circuitry to:
  identify one sets of the plurality of sorted elements from the first set of the sorted sequence and another sets of the plurality of sorted elements from the second set of the sorted sequence;
  compare each of the plurality of the sorted elements in each of the identified one sets from the first sequence of the sorted sequence with each of the plurality of the sorted elements in each of the identified another sets from the second set of the sorted sequence;
  select the sorted elements from each of the identified one sets from the first sequence of the sorted sequence based on the comparison;
  compare each of the plurality of the sorted elements in each of the identified other sets from the second sequence of the sorted sequence with each of the plurality of the sorted elements in each of the identified one sets from the first set of the sorted sequence;
  select the sorted elements from each of the identified other sets from the second sequence of the sorted sequence based on the comparison;
  join the selected sorted elements from each of the identified one sets from the first sequence of sorted sequence with the selected sorted elements from each of the identified other sets from the second sequence of the sorted sequence to generate a merged sequence comprising the combined selected sorted elements; and
  place the combined selected sorted elements in an order to generate a merged sorted sequence.

16. A method comprising:
  left shifting, by a crossbar circuit of a processing device, each of a plurality of elements in corresponding positions in a set of registers by a set of bits;
  modifying, by the crossbar circuit of the processing device, each of the plurality of elements by a position value of the corresponding position in a set of registers, the adding to result in a plurality of transformed elements in corresponding positions, wherein each of the plurality of elements comprise a plurality of bits;
  comparing, via at least one of a greater than or less than operations in the crossbar circuit, each of the plurality of transformed elements to itself and to one another;
  assigning, by the crossbar circuit, one of an enabled indicator or a disabled indicator to each of the plurality of the transformed elements based on the comparison; and
  counting, by a counting circuit of the processing device, a number of the enabled indicators assigned to each of the plurality of the transformed elements to generate a sorted sequence of the plurality of elements.

17. The method of claim 16 wherein the sorted sequence comprises the count of number of enabled indicators.

18. The method of claim 16 further comprising:
  shifting each of the plurality of elements to a left position in each of the corresponding positions responsive to at least a value of one element among the plurality of elements is same as a value of other element among the plurality of elements; and
  generating at least a first set of the sorted sequence of the plurality of sorted elements and second set of the sorted sequence of the plurality of sorted elements.

19. The method of claim 18 further comprising:
  dividing the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence;
  comparing each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and
  generating the position value of the corresponding position of each of the plurality of elements in the third set of the sequence as a merged sorted sequence.

20. The method of claim 18 further comprising:
  identifying one sets of the plurality of sorted elements from the first set of the sorted sequence and another sets of the plurality of sorted elements from the second set of the sorted sequence;
  comparing each of the plurality of the sorted elements in each of the identified one sets from the first sequence of the sorted sequence with each of the plurality of the sorted elements in each of the identified another sets from the second set of the sorted sequence;
  selecting the sorted elements from each of the identified one sets from the first sequence of the sorted sequence based on the comparison;
  comparing each of the plurality of the sorted elements in each of the identified other sets from the second sequence of the sorted sequence with each of the plurality of the sorted elements in each of the identified one sets from the first set of the sorted sequence;
  selecting the sorted elements from each of the identified other sets from the second sequence of the sorted sequence based on the comparison;
  joining the selected sorted elements from each of the identified one sets from the first sequence of sorted sequence with the selected sorted elements from each of the identified other sets from the second sequence of the sorted sequence to generate a merged sequence comprising the combined selected sorted elements; and
  placing the combined selected sorted elements in an order to generate a merged sorted sequence.

21. A non-transitory machine-readable storage medium including instructions that, when accessed by a processing device, cause the processing device to perform operations comprising:

left shifting, by a crossbar circuit of the processing device, each of a plurality of elements in corresponding positions in a set of registers by a set of bits;

modifying, by the crossbar circuit of the processing device, each of the plurality of elements by a position value of the corresponding position in a set of registers, the adding to result in a plurality of transformed elements in corresponding positions, wherein each of the plurality of elements comprise a plurality of bits;

comparing, via at least one of a greater than or less than operations in the crossbar circuit, each of the plurality of transformed elements to itself and to one another;

assigning, by the crossbar circuit, one of an enabled indicator or a disabled indicator to each of the plurality of the transformed elements based on the comparison; and counting, by a counting circuit of the processing device, a number of the enabled indicators assigned to each of the plurality of the transformed elements to generate a sorted sequence of the plurality of elements.

22. The non-transitory machine-readable storage medium of claim 21 wherein the sorted sequence comprises the count of number of enabled indicators.

23. The non-transitory machine-readable storage medium of claim 21 wherein the operations further comprising:

shifting each of the plurality of elements to a left position in each of the corresponding positions responsive to at least a value of one element among the plurality of elements is same as a value of other element among the plurality of elements; and generating at least a first set of the sorted sequence of the plurality of sorted elements and second set of the sorted sequence of the plurality of sorted elements.

24. The non-transitory machine-readable storage medium of claim 23 wherein the operations further comprising:

dividing the first set of the sorted sequence into a first half and the second set of the sorted sequence into a second half, wherein the first half comprises the plurality of sorted elements of the first set of the sorted sequence and the second half comprises the plurality of sorted elements of the second set of the sorted sequence;

comparing each of the plurality of sorted elements in the first half to each of the plurality of sorted elements in the second half and compare each of the plurality of sorted elements in the second half to each of the plurality of sorted elements in the first half to generate a third set of the sequence of the plurality of sorted elements in an order; and generating the position value of the corresponding position of each of the plurality of elements in the third set of the sequence as a merged sorted sequence.

25. The non-transitory machine-readable storage medium of claim 23 wherein the operations further comprising:

identifying one sets of the plurality of sorted elements from the first set of the sorted sequence and another sets of the plurality of sorted elements from the second set of the sorted sequence;

comparing each of the plurality of the sorted elements in each of the identified one sets from the first sequence of the sorted sequence with each of the plurality of the sorted elements in each of the identified another sets from the second set of the sorted sequence;

selecting the sorted elements from each of the identified one sets from the first sequence of the sorted sequence based on the comparison;

comparing each of the plurality of the sorted elements in each of the identified other sets from the second sequence of the sorted sequence with each of the plurality of the sorted elements in each of the identified one sets from the first set of the sorted sequence;

selecting the sorted elements from each of the identified other sets from the second sequence of the sorted sequence based on the comparison;

joining the selected sorted elements from each of the identified one sets from the first sequence of sorted sequence with the selected sorted elements from each of the identified other sets from the second sequence of the sorted sequence to generate a merged sequence comprising the combined selected sorted elements; and placing the combined selected sorted elements in an order to generate a merged sorted sequence.

* * * * *